US005687546A

United States Patent [19]
Weder et al.

[11] Patent Number: 5,687,546
[45] Date of Patent: *Nov. 18, 1997

[54] METHOD FOR PROVIDING A DECORATIVE COVER ABOUT A FLORAL GROUPING

[75] Inventors: Donald E. Weder; Joseph G. Straeter, both of Highland; William F. Straeter, Breese, all of Ill.

[73] Assignee: Southpac Trust International, Inc.

[*] Notice: The term of this patent shall not extend beyond the expiration date of Pat. No. 5,408,803.

[21] Appl. No.: 465,480

[22] Filed: Jun. 5, 1995

Related U.S. Application Data

[63] Continuation-in-part of Ser. No. 93,838, Jul. 19, 1993, Pat. No. 5,467,573, Ser. No. 247,121, May 20, 1994, Pat. No. 5,452,560, and Ser. No. 329,607, Oct. 25, 1994, which is a continuation-in-part of Ser. No. 253,648, Jun. 3, 1994, abandoned, which is a continuation of Ser. No. 965,585, Oct. 23, 1992, abandoned, which is a continuation of Ser. No. 893,586, Jun. 2, 1992, Pat. No. 5,181,364, which is a continuation of Ser. No. 707,417, May 28, 1991, abandoned, which is a continuation of Ser. No. 502,358, Mar. 29, 1990, abandoned, which is a continuation-in-part of Ser. No. 249,761, Sep. 26, 1988, abandoned, which is a continuation-in-part of Ser. No. 219,083, Jul. 13, 1988, Pat. No. 4,897,031, which is a continuation of Ser. No. 4,275, Jan. 5, 1987, Pat. No. 4,773,182, which is a continuation of Ser. No. 613,080, May 22, 1984, abandoned, said Ser. No. 93,838, is a continuation-in-part of Ser. No. 963,882, Oct. 20, 1992, Pat. No. 5,408,803, which is a continuation-in-part of Ser. No. 865,563, Apr. 9, 1992, Pat. No. 5,245,814, which is a continuation of Ser. No. 649,379, Jan. 31, 1991, Pat. No. 5,111,638, which is a continuation of Ser. No. 249,761, said Ser. No. 963,882, is a continuation-in-part of Ser. No. 893,586, which is a continuation of Ser. No. 707,417, which is a continuation of Ser. No. 502,358, which is a continuation-in-part of Ser. No. 391,463, Aug. 9, 1989, abandoned, and Ser. No. 249,761, said Ser. No. 247,121, is a continuation of Ser. No. 949,175, Sep. 22, 1992, Pat. No. 5,339,601, which is a continuation-in-part of Ser. No. 926,098, Aug. 5, 1992, abandoned, which is a continuation-in-part of Ser. No. 803,318, Dec. 4, 1991, Pat. No. 5,344,016, which is a continuation-in-part of Ser. No. 707,417, said Ser. No. 926,098, is a continuation-in-part of Ser. No. 687,701, Apr. 18, 1991, abandoned, which is a continuation-in-part of Ser. No. 649,263, Jan. 30, 1991, abandoned, which is a continuation of Ser. No. 248,960, Sep. 26, 1988, abandoned, which is a continuation-in-part of Ser. No. 219,083, said Ser. No. 949,175, is a continuation-in-part of Ser. No. 819,311, Jan. 9, 1992, abandoned, which is a continuation of Ser. No. 765,416, Sep. 26, 1991, Pat. No. 5,105,599, which is a continuation of Ser. No. 530,491, May 29, 1990, abandoned, which is a continuation of Ser. No. 315,169, Feb. 24, 1989, abandoned, said Ser. No. 949,175, is a continuation-in-part of Ser. No. 876,947, May 1, 1992, Pat. No. 5,396,992, which is a continuation of Ser. No. 708,521, May 31, 1991, Pat. No. 5,161,348, which is a division of Ser. No. 360,367, Jun. 2, 1989, Pat. No. 5,038,933.

[51] Int. Cl.$^6$ .......................... B65B 11/02; B65B 11/48; B65B 25/02
[52] U.S. Cl. ........................ 53/397; 53/399; 53/465; 53/419
[58] Field of Search .......................... 53/397, 399, 419, 53/416, 417, 465, 414

[56] References Cited

U.S. PATENT DOCUMENTS

| | | |
|---|---|---|
| 809,299 | 1/1906 | Henke et al. . |
| 1,446,563 | 2/1923 | Hughes . |

(List continued on next page.)

FOREIGN PATENT DOCUMENTS

| | | | |
|---|---|---|---|
| 46110 | 10/1961 | France | .................................. 53/414 |
| 9300325 | 8/1993 | WIPO . | |

*Primary Examiner*—Linda Johnson
*Attorney, Agent, or Firm*—Dunlap & Codding, P.C.

[57] ABSTRACT

A method for wrapping a floral arrangement wherein a sheet of material having one end of a band connected thereto is wrapped about the floral arrangement so as to provide a decorative covering. The band has a bonding material disposed on at least a portion thereof, such that when the sheet of material is extended about the floral arrangement and a portion of the decorative covering is crimped to provide a decorative covering for the floral arrangement, the second end of the band is connected to the sheet of material forming the decorative covering or to the band for securing the band in position about the sheet of material.

28 Claims, 11 Drawing Sheets

U.S. PATENT DOCUMENTS

| | | | |
|---|---|---|---|
| 1,616,804 | 2/1927 | Ingram | 53/417 |
| 2,170,147 | 8/1939 | Lane | 286/56 |
| 2,371,985 | 3/1945 | Freiberg | 206/46 |
| 2,529,060 | 11/1950 | Trillich . | |
| 3,134,679 | 5/1964 | Dreyfus | 53/397 |
| 3,271,922 | 9/1966 | Wallerstein et al. | 53/3 |
| 3,273,302 | 9/1966 | Walter | 53/39 |
| 3,322,325 | 5/1967 | Bush | 53/419 X |
| 3,376,666 | 4/1968 | Leonard | 47/41 |
| 3,403,840 | 10/1968 | Mathes | 229/51 |
| 3,508,372 | 4/1970 | Wallerstein et al. | 53/3 |
| 4,765,464 | 8/1988 | Ristvedt | 206/0.82 |
| 4,801,014 | 1/1989 | Meadows | 205/423 |
| 5,111,638 | 5/1992 | Weder | 53/397 |
| 5,205,108 | 4/1993 | Weder et al. | 53/397 |
| 5,307,605 | 5/1994 | Straeter | 53/397 |
| 5,335,475 | 8/1994 | Weder et al. | 53/397 |
| 5,335,476 | 8/1994 | Weder | 53/397 |
| 5,335,477 | 8/1994 | Weder | 53/399 |
| 5,339,601 | 8/1994 | Weder et al. | 53/397 |
| 5,353,575 | 10/1994 | Stepanek | 53/461 |
| 5,373,942 | 12/1994 | Weder | 53/399 |
| 5,428,939 | 7/1995 | Weder et al. | 53/397 |

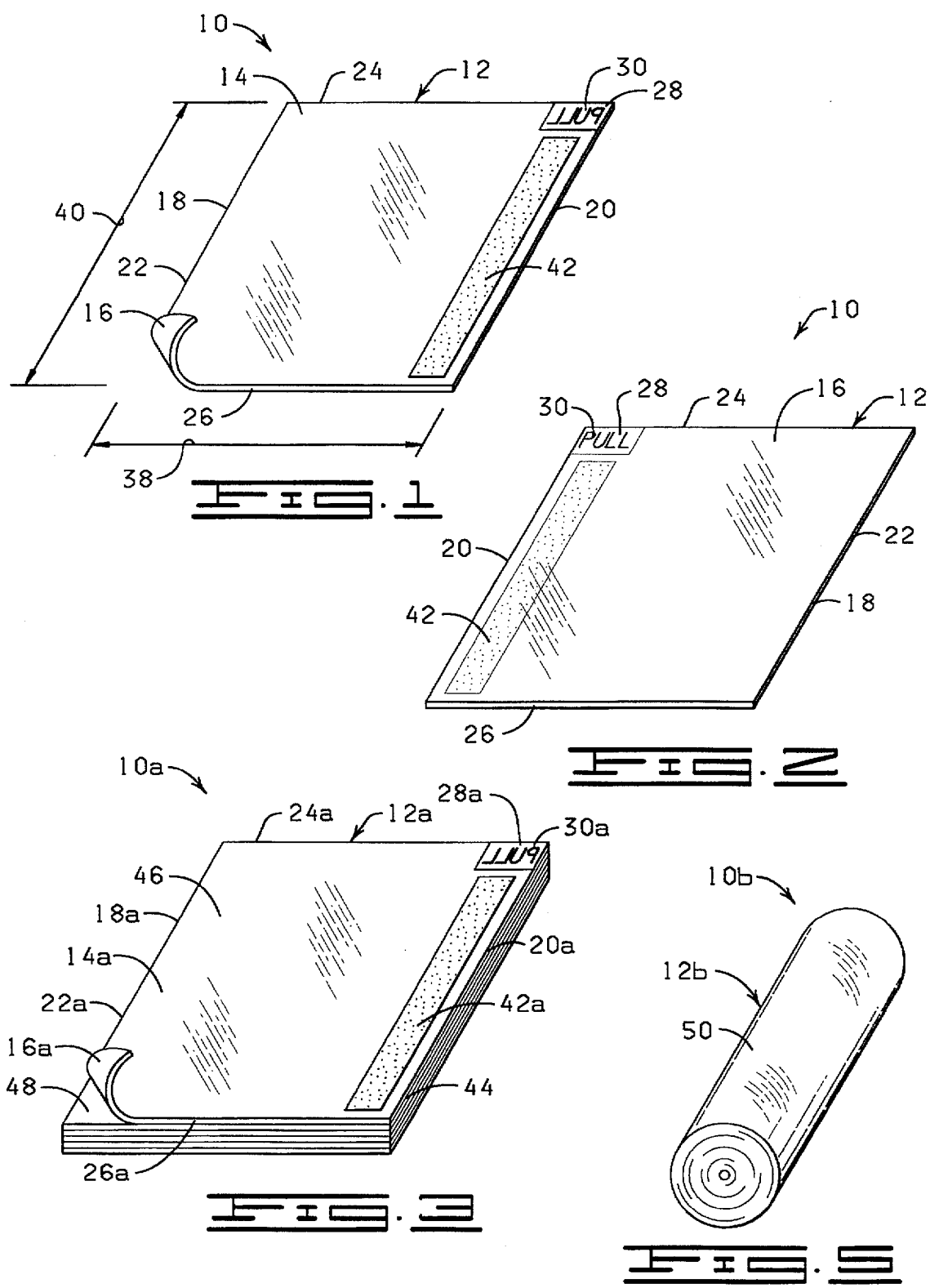

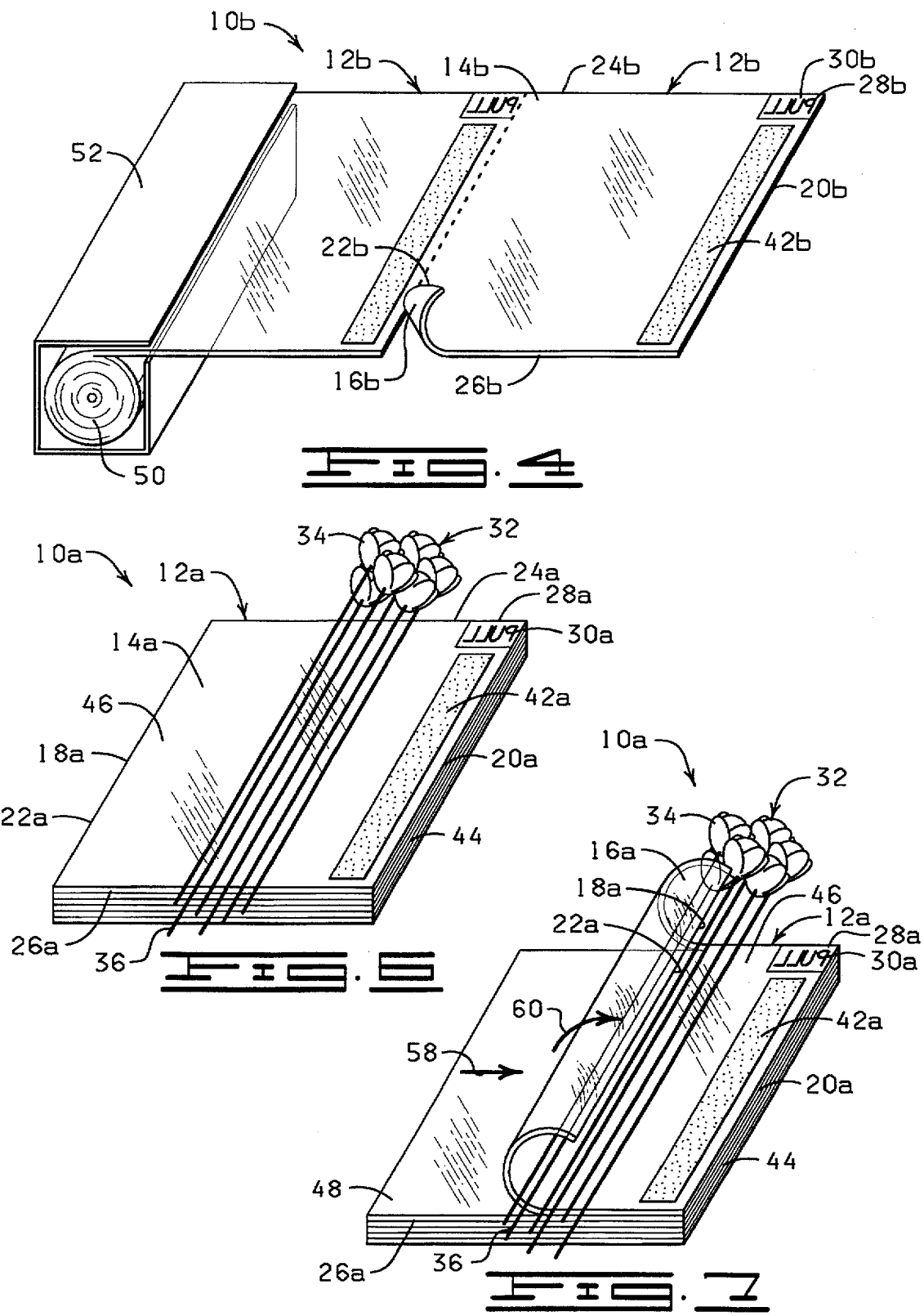

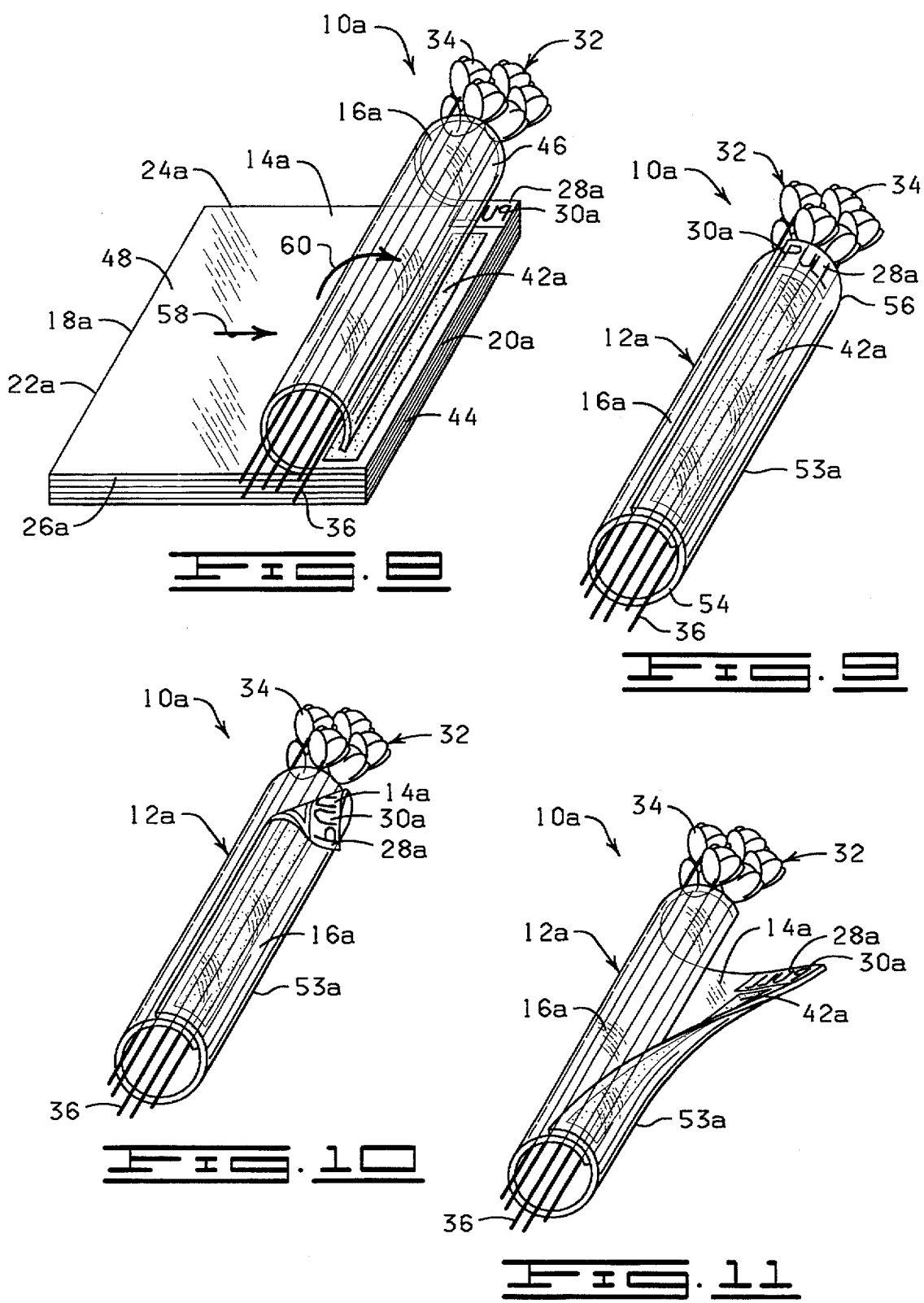

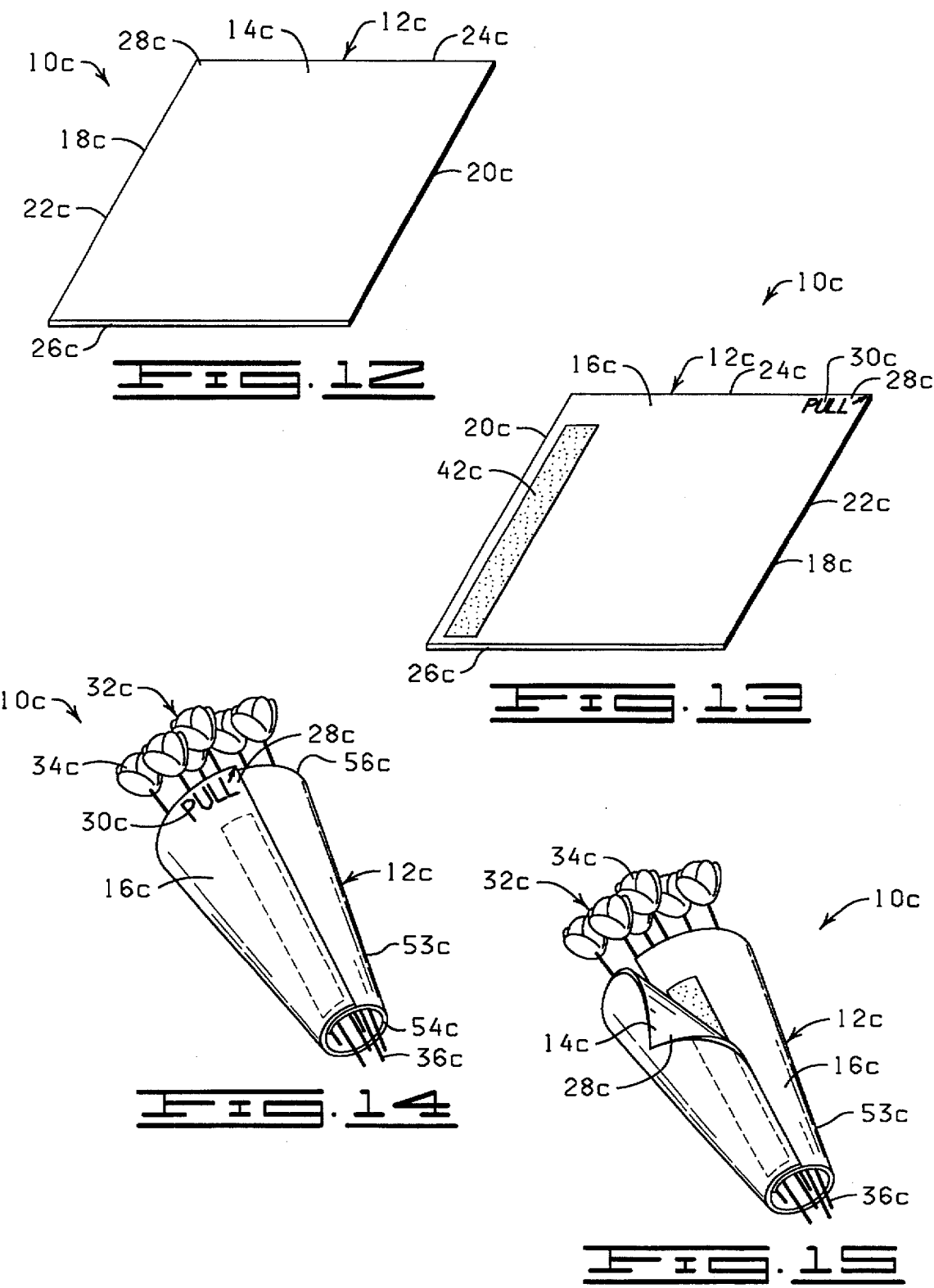

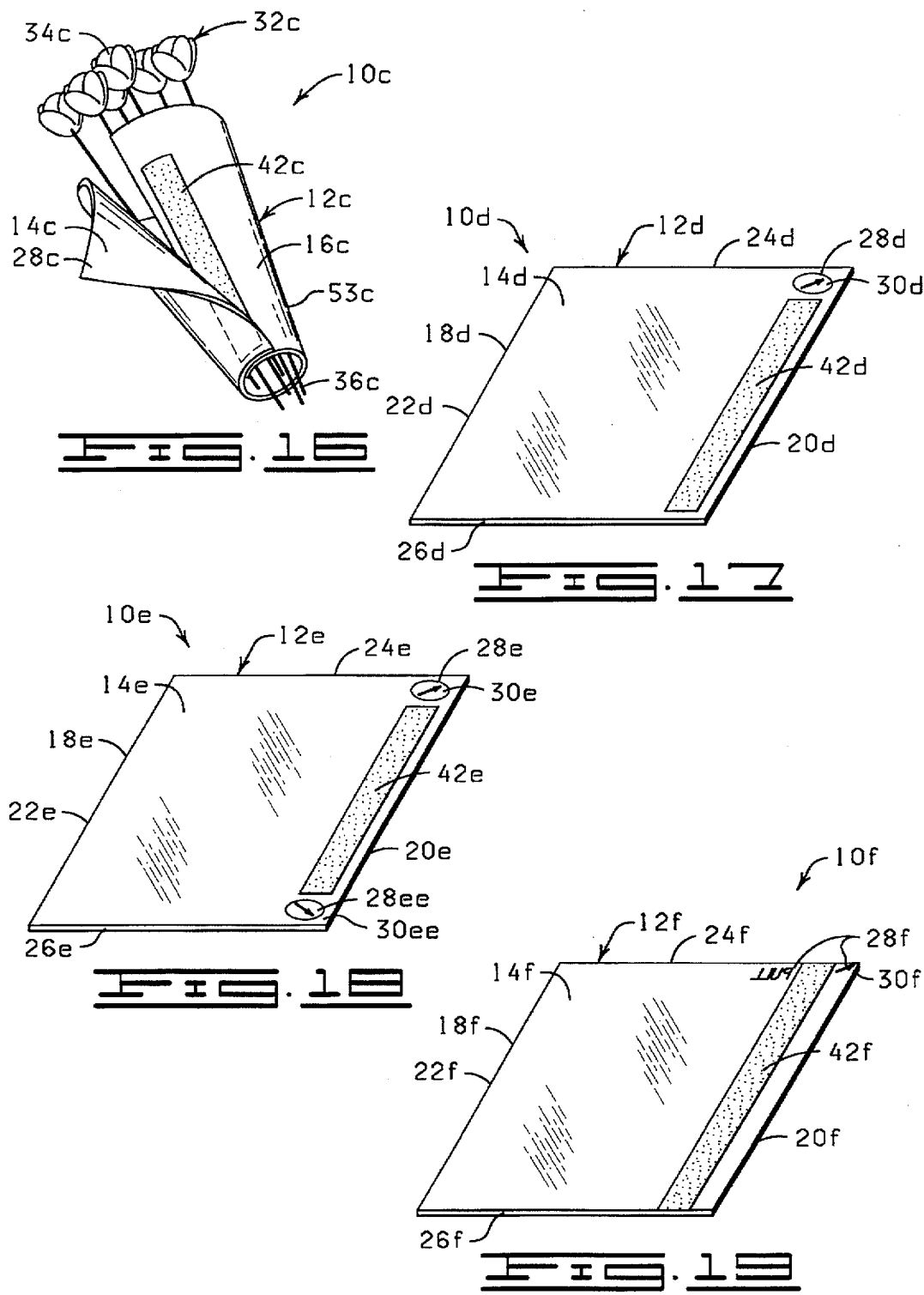

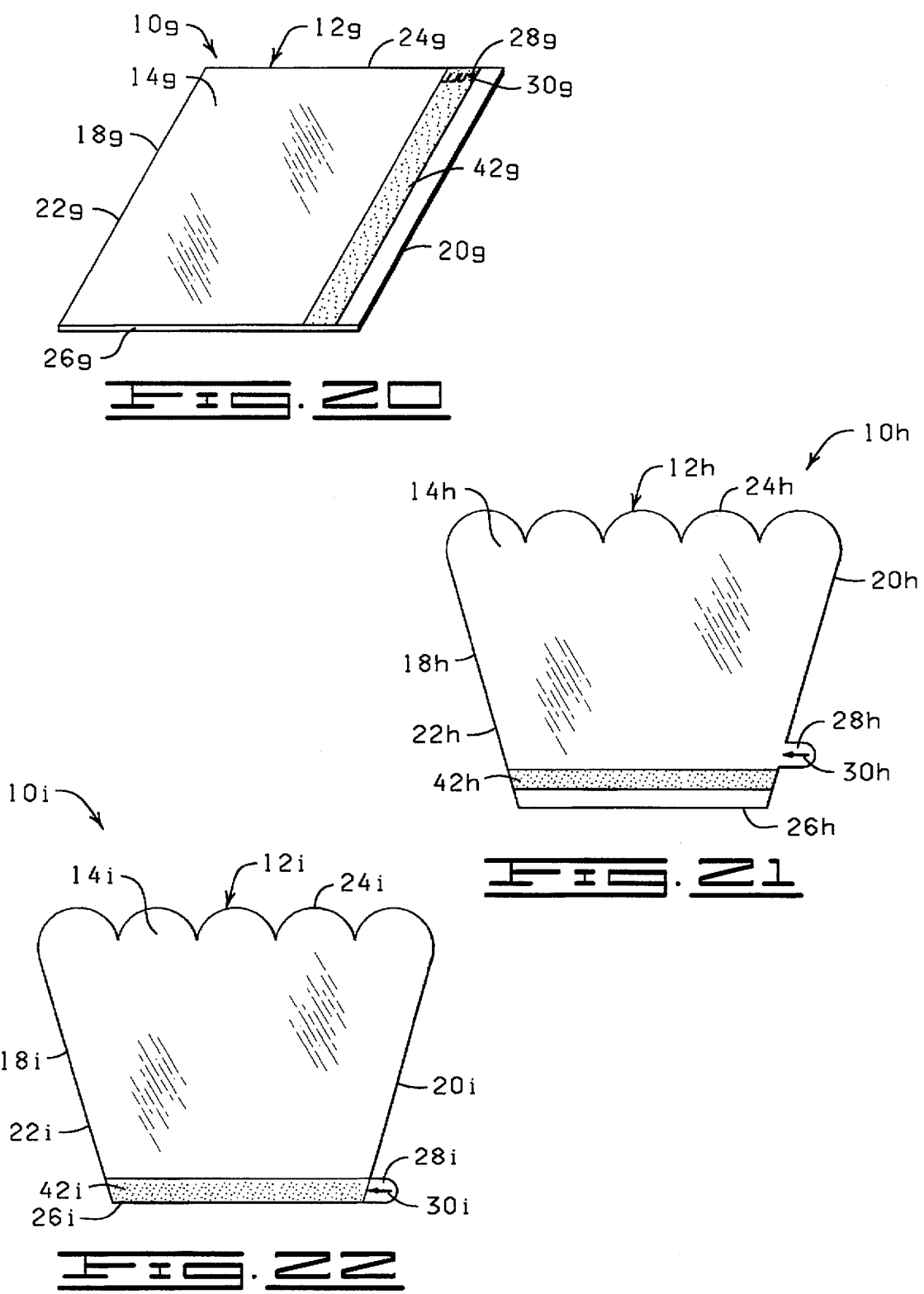

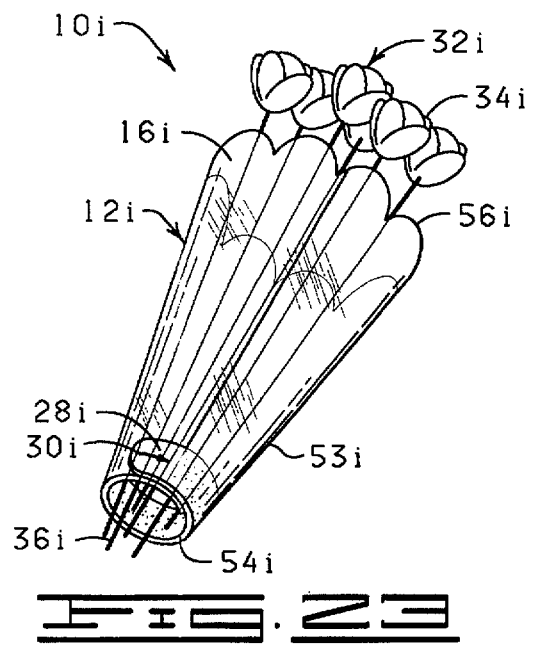
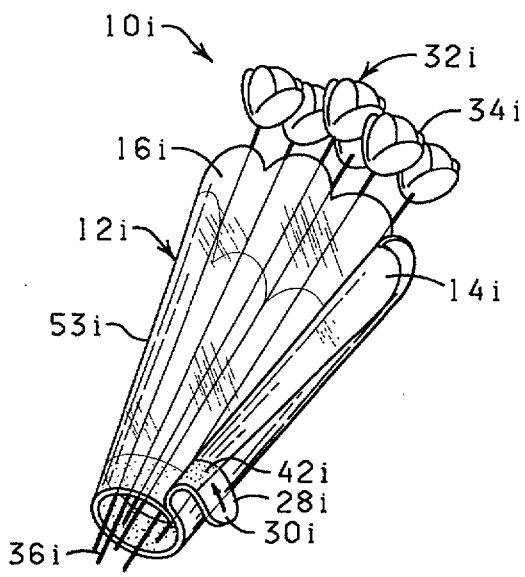# ## ##
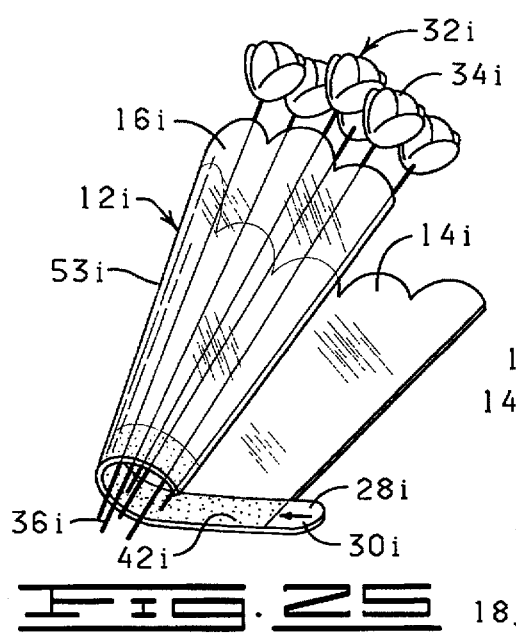
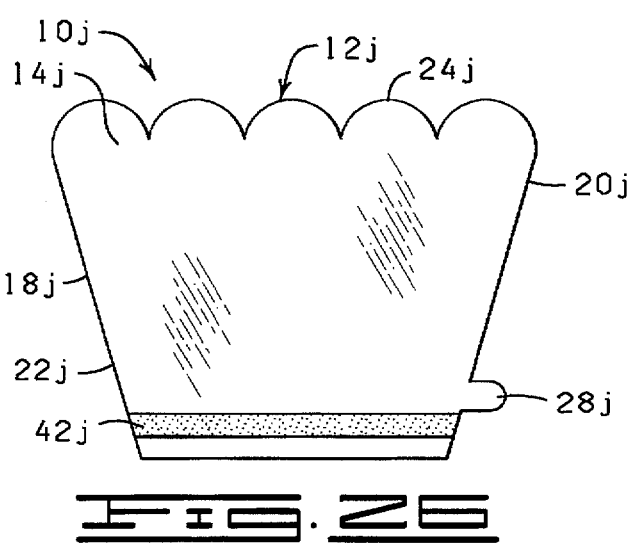

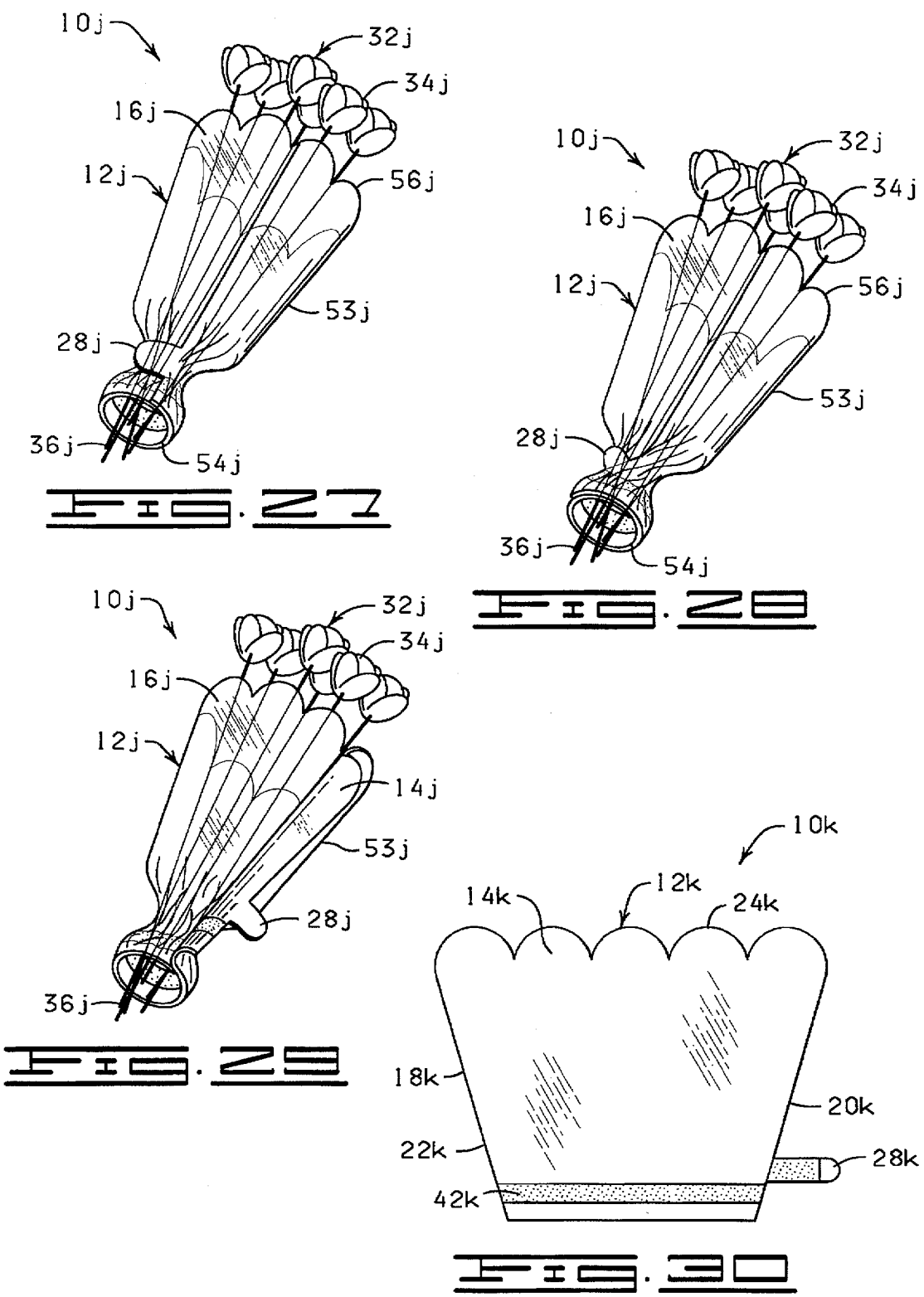

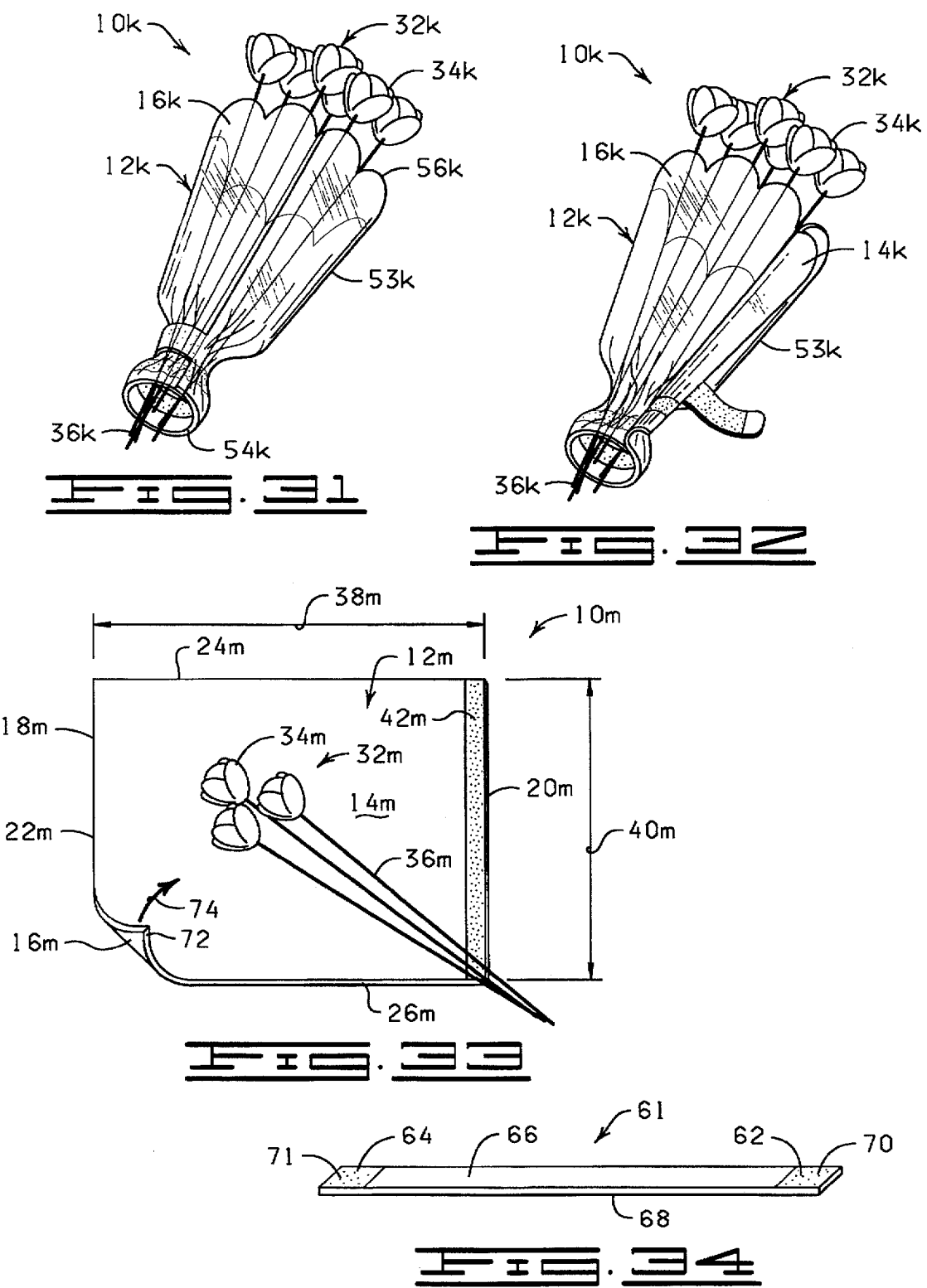

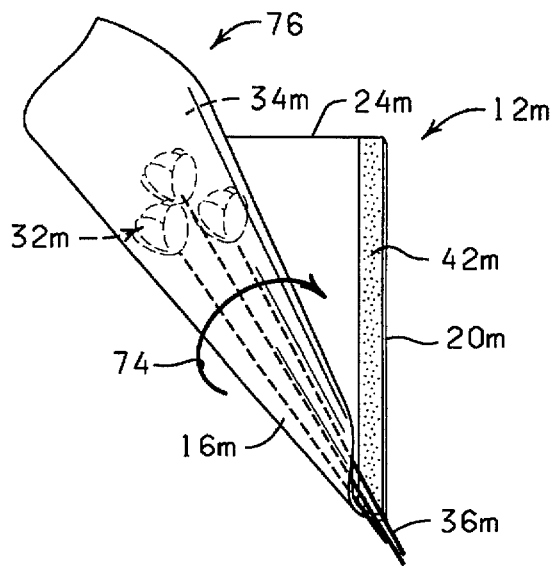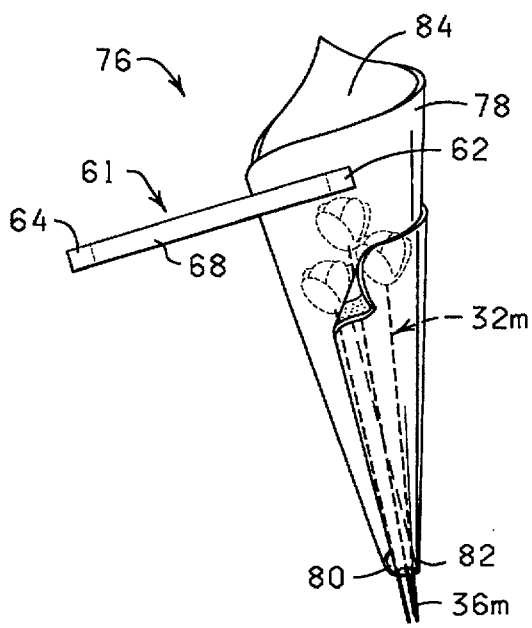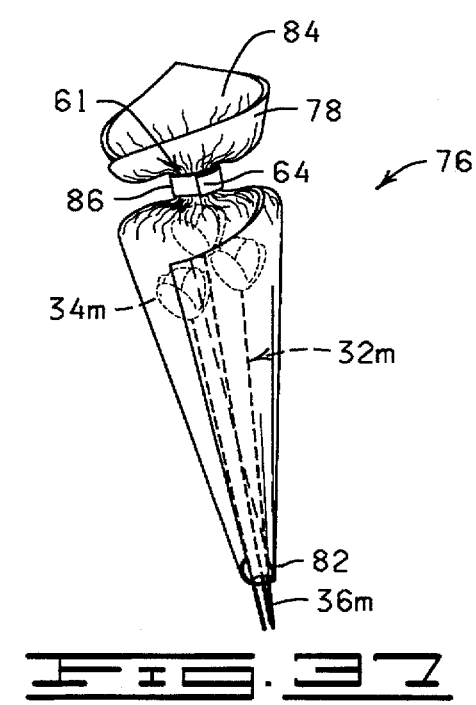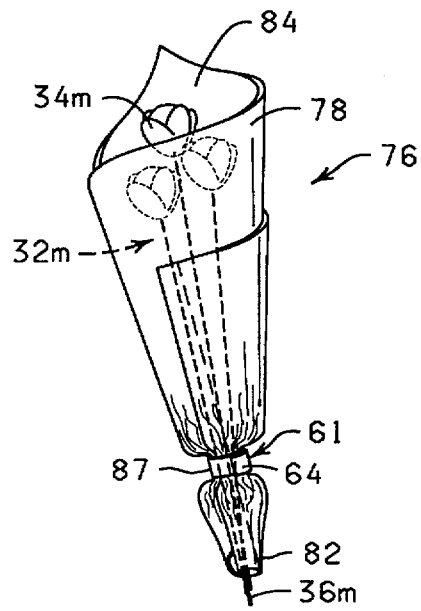

METHOD FOR PROVIDING A DECORATIVE COVER ABOUT A FLORAL GROUPING

CROSS-REFERENCE TO RELATED APPLICATIONS

This application is a continuation-in-part of U.S. Ser. No. 08/093,838, filed Jul. 19, 1993, entitled METHOD OF USING A WRAPPING MATERIAL HAVING A PULL TAB AND PULL INDICIA FOR WRAPPING A FLORAL ARRANGEMENT now U.S. Pat. No. 5,467,573 issued Nov. 21, 1995; which is a continuation-in-part of U.S. Ser. No. 07/963,882, filed Oct. 20, 1992, entitled WRAPPING MATERIAL HAVING A PULL TAB AND PULLING INDICIA FOR WRAPPING A FLORAL ARRANGEMENT AND METHOD, now U.S. Pat. No. 5,408,803, issued Apr. 25, 1995; which is a continuation-in-part of U.S. Ser. No. 07/865,563, filed Apr. 9, 1992, entitled METHOD FOR WRAPPING A FLORAL GROUPING, now U.S. Pat. No. 5,245,814, issued Sep. 21, 1993; which is a continuation of U.S. Ser. No. 07/649,379, filed Jan. 31, 1991, entitled METHOD FOR WRAPPING AN OBJECT WITH A MATERIAL HAVING PRESSURE SENSITIVE ADHESIVE THEREON, now U.S. Pat. No. 5,111,638, issued May 12, 1992; which is a continuation of U.S. Ser. No. 07/249,761, filed Sep. 26, 1988, entitled METHOD FOR WRAPPING AN OBJECT WITH A MATERIAL HAVING PRESSURE SENSITIVE ADHESIVE THEREON, now abandoned; and said application Ser. No. 07/963,882 is also a continuation-in-part of U.S. Ser. No. 07/893,586, filed Jun. 02, 1992, entitled WRAPPING A FLORAL GROUPING WITH SHEETS HAVING ADHESIVE OR COHESIVE MATERIAL APPLIED THERETO, now U.S. Pat. No. 5,181,364, issued Jan. 26, 1993; which is a continuation of U.S. Ser. No. 07/707,417, filed May 28, 1991, entitled WRAPPING A FLORAL GROUPING WITH SHEETS HAVING ADHESIVE OR COHESIVE MATERIAL APPLIED THERETO, now abandoned, which is a continuation of U.S. Ser. No. 07/502,358, filed Mar. 29, 1990, entitled WRAPPING A FLORAL GROUPING WITH SHEETS HAVING ADHESIVE OR COHESIVE MATERIAL APPLIED THERETO, now abandoned, which is a continuation-in-part of U.S. Ser. No. 07/391,463, filed Aug. 09, 1989, entitled ADHESIVE APPLICATOR DISPENSER, now abandoned, and said application Ser. No. 07/502,358 is also a continuation-in-part of U.S. Ser. No. 07/249,761, filed Sep. 26, 1988, entitled METHOD FOR WRAPPING AN OBJECT WITH A MATERIAL HAVING PRESSURE SENSITIVE ADHESIVE THEREON, now abandoned.

This application is also a continuation-in-part of U.S. Ser. No. 08/247,121, filed May 20, 1994, entitled DECORATIVE COVER WITH BAND now U.S. Pat. No. 5,752,560 issued Sep. 6,1995; which is a continuation of U.S. Ser. No. 07/949,175, filed Sep. 22, 1992, entitled DECORATIVE COVER WITH BAND, now issued U.S. Pat. No. 5,339,601, issued Aug. 23, 1994; which is a continuation-in-part of U.S. Ser. No. 07/926,098, filed Aug. 5, 1992, entitled METHOD AND APPARATUS FOR FORMING A DECORATIVE COVER, now abandoned; which is a continuation-in-part of U.S. Ser. No. 07/803,318, filed Dec. 4, 1991, entitled WRAPPING MATERIAL FOR WRAPPING A FLORAL GROUPING HAVE STAGGERED STRIPS OF ADHESIVE APPLIED THERETO AND METHOD, now U.S. Pat. No. 5,344,016, issued Sep., 6, 1994; which is a continuation-in-part of U.S. Ser. No. 07/707,417, filed May 28, 1991, entitled WRAPPING A FLORAL GROUPING WITH SHEETS HAVING ADHESIVE OR COHESIVE MATERIAL APPLIED THERETO, now abandoned; which is a continuation of U.S. Ser. No. 07/502,358, filed Mar. 29, 1990, entitled WRAPPING A FLORAL GROUPING WITH SHEETS HAVING ADHESIVE OR COHESIVE MATERIAL APPLIED THERETO, now abandoned; which is a continuation-in-part of U.S. Ser. No. 07/249,761, filed Sep. 26, 1988, entitled METHOD FOR WRAPPING AN OBJECT WITH A MATERIAL HAVING PRESSURE SENSITIVE ADHESIVE THEREON, now abandoned; which is a continuation-in-part of U.S. Ser. No. 07/219,083, filed Jul. 13, 1988, entitled ARTICLE FORMING SYSTEM, now U.S. Pat. No. 4,897,031, issued Jan. 30, 1990; which is a continuation of U.S. Ser. No. 07/004,275, filed Jan. 5, 1987, entitled ARTICLE FORMING SYSTEM, now U.S. Pat. No. 4,773,182, issued Sep. 27, 1988; which is a continuation of U.S. Ser. No. 06/613,080, filed May 22, 1984, entitled ARTICLE FORMING SYSTEM, now abandoned; and said application Ser. No. 07/926,098 is also a continuation-in-part of U.S. Ser. No. 07/687,701, filed Apr. 18, 1991, entitled WRAPPING MATERIAL HAVING A SHAPE SUSTAINING ELEMENT AND METHOD, now abandoned; which is a continuation-in-part of U.S. Ser. No. 07/649,263, filed Jan. 30, 1991, entitled FLEXIBLE VASE, now abandoned; which is a continuation of U.S. Ser. No. 07/248,960, filed Sep. 26, 1988, entitled FLEXIBLE VASE, now abandoned; which is a continuation-in-part of U.S. Ser. No. 07/219,083, filed Jul. 13, 1988, entitled ARTICLE FORMING SYSTEM, now U.S. Pat. No. 4,897,031, issued Jan. 30, 1990; which is a continuation of U.S. Ser. No. 07/004,275, filed Jan. 5, 1987, entitled ARTICLE FORMING SYSTEM, now U.S. Pat. No. 4,773,182, issued Sep. 27, 1988; which is a continuation of U.S. Ser. No. 613,080, filed May 22, 1984, entitled ARTICLE FORMING SYSTEM, now abandoned; and said application Ser. No. 07/949,175 is also a continuation-in-part of U.S. Ser. No. 07/819,311, filed Jan. 9, 1992, entitled MEANS FOR SECURING A DECORATIVE COVER ABOUT A FLOWER POT, now abandoned; which is a continuation of U.S. Ser. No. 07/765,416, filed Sep. 26, 1991, entitled MEANS FOR SECURING A DECORATIVE COVER ABOUT A FLOWER POT, now U.S. Pat. No. 5,105,599, issued Apr. 21, 1992; which is a continuation of U.S. Ser. No. 07/530,491, filed May 29, 1990, entitled MEANS FOR SECURING A DECORATIVE COVER ABOUT A FLOWER POT, now abandoned; which is a continuation of U.S. Ser. No. 07/315,169, filed Feb. 24, 1989, entitled MEANS FOR SECURING A DECORATIVE COVER ABOUT A FLOWER POT, now abandoned; and said application Ser. No. 07/949,175 is also a continuation-in-part of U.S. Ser. No. 07/876,947, filed May 1, 1992, entitled WRAPPING MATERIAL FOR PROVIDING A DECORATIVE COVERING, now U.S. Pat. No. 5,396,992, issued Mar. 14, 1995; which is a continuation of U.S. Ser. No. 07/708,521, filed May 31, 1991, entitled WRAPPING MATERIAL FOR PROVIDING A DECORATIVE COVERING, now U.S. Pat. No. 5,161,348, issued Nov. 10, 1992; which is a divisional of U.S. Ser. No. 07/360,367, filed Jun. 2, 1989, entitled WRAPPING MATERIAL FOR PROVIDING A DECORATIVE COVERING, now U.S. Pat. No. 5,038,933, issued Aug. 13, 1991.

This application is also a continuation-in-part of copending U.S. Ser. No. 08/329,607, filed Oct. 25, 1994, entitled WRAPPING A FLORAL GROUPING WITH SHEETS HAVING ADHESIVE MATERIAL APPLIED THERETO; which is a continuation-in-part of U.S. Ser. No. 08/253,648, filed Jun. 3, 1994, entitled WRAPPING A FLORAL GROUPING WITH SHEETS HAVING ADHESIVE OR COHESIVE MATERIAL APPLIED THERETO, now abandoned; which is a continuation of U.S. Ser. No. 07/965,585, filed Oct. 23, 1992, entitled WRAPPING A FLORAL GROUPING WITH SHEETS HAVING ADHESIVE OR COHESIVE MATERIAL APPLIED THERETO, now abandoned; which is a continuation of U.S. Ser. No. 07/893,586, filed Jun. 2, 1992, entitled WRAPPING A FLORAL GROUPING WITH SHEETS HAVING ADHESIVE OR COHESIVE MATERIAL APPLIED THERETO, now U.S. Pat. No. 5,181,364, issued Jan. 26, 1993; which is a continuation of U.S. Ser. No. 07/707,417, filed May 28, 1991, entitled WRAPPING A FLORAL GROUPING WITH SHEETS HAVING ADHESIVE OR COHESIVE MATERIAL APPLIED THERETO, now abandoned; which is a continuation of U.S. Ser. No. 07/502,358, filed Mar. 29, 1990, entitled WRAPPING A FLORAL GROUPING WITH SHEETS HAVING ADHESIVE OR COHESIVE MATERIAL APPLIED THERETO, now abandoned; which is a continuation-in-part of U.S. Ser. No. 07/249,761, filed Sep. 26, 1988, entitled METHOD FOR WRAPPING AN OBJECT WITH A MATERIAL HAVING PRESSURE SENSITIVE ADHESIVE THEREON, now abandoned; which is a continuation-in-part of U.S. Ser. No. 07/219,083, filed Jul. 13, 1988, entitled ARTICLE FORMING SYSTEM, now U.S. Pat. No. 4,897,031, issued Jan. 30, 1990; which is a continuation of U.S. Ser. No. 07/004,275, filed Jan. 05, 1987, entitled ARTICLE FORMING SYSTEM, now U.S. Pat. No. 4,773,182, issued Sep. 27, 1988; which is a continuation of U.S. Ser. No. 06/613,080, filed May 22, 1984, entitled ARTICLE FORMING SYSTEM, now abandoned.

FIELD OF THE INVENTION

This invention generally relates to wrapping materials and, more particularly, to wrapping materials having a pull tab and pull indicia for both wrapping a floral arrangement and removing the wrapping material from a floral arrangement, and the method of using same.

In another aspect, the invention relates to decorative coverings for floral arrangements, and more particularly, but not by way of limitation, to wrapping a sheet of material about a floral arrangement and extending a band about a portion of the decorative covering to form a crimped portion in the decorative covering.

BRIEF DESCRIPTION OF THE DRAWINGS

FIG. 1 is a perspective view of a wrapping material showing an upper surface, the wrapping material being transparent and having a bonding material extending along one side, a pull tab and pull indicia being located immediately above a bonding material.

FIG. 2 is a perspective view of the wrapping material of FIG. 1, but showing a lower surface thereof.

FIG. 3 is a perspective view of the wrapping material of FIG. 1, but showing a plurality of sheets of material comprising a pad.

FIG. 4 is a perspective view of the wrapping material of FIG. 1, but showing a continuous roll of material comprising a plurality of sheets of material contained within a roll in a dispenser.

FIG. 5 is a perspective view of the wrapping material of FIG. 1, but showing a continuous roll of material comprising a plurality of sheets of material contained within a roll.

FIG. 6 is a perspective view of the wrapping material of FIG. 3, but showing a floral arrangement disposed thereon.

FIG. 7 is a perspective view of the wrapping material of FIG. 3, but showing a partially wrapped floral arrangement.

FIG. 8 is a perspective view of the wrapping material of FIG. 3, but showing a partially wrapped floral arrangement.

FIG. 9 is a perspective view of the wrapping material of FIG. 3, but showing a wrapped floral arrangement.

FIG. 10 is a perspective view of the wrapped floral arrangement of FIG. 9, but showing the floral arrangement partially unwrapped.

FIG. 11 is a perspective view of the wrapped floral arrangement of FIG. 9, but showing the wrapping material unwrapping from around the floral arrangement.

FIG. 12 is a perspective view of a modified wrapping material constructed exactly like the wrapping material of FIGS. 1 and 2, but showing a non-transparent wrapping material with no pull indicia on an upper surface of the sheet of material.

FIG. 13 is a perspective view of the wrapping material of FIG. 12, but showing the pull indicia disposed on a lower surface of the sheet of material.

FIG. 14 is a perspective view of the wrapping material of FIG. 12, but showing a wrapped floral arrangement, the pull indicia being readily apparent.

FIG. 15 is a perspective view of the wrapped floral arrangement of FIG. 14, but showing the floral arrangement partially unwrapped.

FIG. 16 is a perspective view of the wrapped floral arrangement of FIG. 14, the wrapping material unwrapping from around the floral arrangement.

FIG. 17 is a perspective view of a modified wrapping material constructed exactly like the wrapping material of FIGS. 1 and 2, but showing pull indicia as symbols.

FIG. 18 is a perspective view of a modified wrapping material constructed exactly like the wrapping material of FIGS. 1 and 2, but showing a first pull tab and a second pull tab and corresponding first pull indicia and second pull indicia disposed thereon, the pull indicia represented as symbols.

FIG. 19 is a perspective view of a modified wrapping material constructed exactly like the wrapping material of FIGS. 1 and 2, but showing a bonding material extending substantially along the length of one side of the sheet of material, pull indicia being located to either side of the bonding material.

FIG. 20 is a perspective view of a modified wrapping material constructed exactly like the wrapping material of FIGS. 1 and 2, but showing bonding material extending substantially along the length of one side of the sheet of material, a pull tab and pull indicia being located at an upper end of the bonding material, the bonding material having less bonding at the site of the pull tab and pull indicia.

FIG. 21 is a perspective view of a modified wrapping material constructed exactly like the wrapping material of FIGS. 1 and 2, but showing the sheet of material as a trapezoidal shape, one side having a scalloped design, bonding material extending along a lower side of the sheet of material, a pull tab being disposed on an adjoining side of the sheet of material comprising an extension of the sheet of material, the pull indicia being represented as a symbol disposed on the pull tab.

FIG. 22 is a perspective view of a modified wrapping material constructed exactly like the wrapping material of FIG. 21, but showing a pull tab and pull indicia thereon as an extension located at the same level as a bonding material.

FIG. 23 is a perspective view of the wrapping material of FIG. 22, showing a wrapped floral arrangement.

FIG. 24 is a perspective view of the wrapped floral arrangement of FIG. 23, but showing the floral arrangement partially unwrapped.

FIG. 25 is a perspective view of the wrapped floral arrangement of FIG. 23, but showing the wrapping material unwrapping from around the floral arrangement.

FIG. 26 is a perspective view of a wrapping material constructed exactly like the wrapping material of FIG. 21.

FIG. 27 is a perspective view of the wrapping material of FIG. 26 showing a wrapped floral arrangement, but showing the wrapper crimped near the stem end of the floral arrangement.

FIG. 28 is a perspective view of the wrapped floral arrangement, but showing the wrapper crimped near the stem end of the floral arrangement, the crimped end being twisted about the stem end by being rotated clockwise one-quarter turn.

FIG. 29 is a perspective view of the wrapped floral arrangement of FIG. 27, but showing the wrapping material unwrapping from around the floral arrangement.

FIG. 30 is a perspective view of a wrapping material constructed exactly like the wrapping material of FIG. 26, but showing the elongation of the pull tab, the pull tab having a bonding material at partially disposed thereon.

FIG. 31 is a perspective view of the wrapping material of FIG. 30 showing a wrapped floral arrangement, but showing the wrapper crimped near the stem end of the floral arrangement, and showing the pull tab acting to both crimp the wrapping material and retaining the wrapping material in the crimped condition.

FIG. 32 is a perspective view of the wrapped floral arrangement of FIG. 31, but showing the wrapping material unwrapping from around the floral arrangement.

FIG. 33 is a perspective view of a sheet of material of the present invention showing a floral arrangement disposed thereon.

FIG. 34 is a plan view of a band constructed in accordance with the present invention.

FIG. 35 is a perspective view of a floral arrangement having the sheet of material of FIG. 33 extended thereabout and having one end of the band of FIG. 34 connected thereto.

FIG. 36 is a perspective view of a floral arrangement having the sheet of material of FIG. 33 extended thereabout to provide a decorative covering for the floral arrangement wherein the band of FIG. 34 is disposed about the decorative covering for providing a crimped portion in an upper end portion of the decorative covering and for retaining the decorative covering in the crimped condition.

FIG. 37 is a perspective view of a pad containing a plurality of sheets of material for providing a decorative covering for a floral arrangement in accordance with the present invention.

FIG. 38 is a perspective view of the decorative covering having the band of FIG. 34 disposed about a lower portion of the decorative covering for retaining the decorative covering in the crimped condition.

DESCRIPTION OF THE PREFERRED EMBODIMENTS

Definitions

Figure 39:
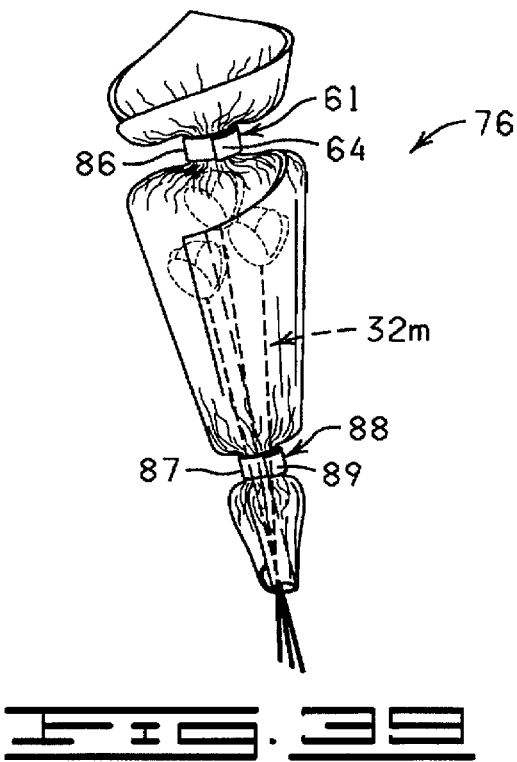
FIG. 39 is a perspective view of a floral arrangement having a sheet of material extended thereabout and having the band of FIG. 34 disposed about the decorative covering for providing a crimped portion in the upper end portion of the decorative covering and a second of the bands of FIG. 34 disposed about the lower portion of the decorative covering.

Floral arrangement as used herein means cut fresh flowers, artificial flowers, other fresh and/or artificial plants or other floral materials and may include other secondary plants and/or ornamentation which add to the aesthetics of the overall floral arrangement.

Polymer as used herein means any polymer film. For example, but not by way of limitation, one polymer film is a polypropylene film. Another example of a polymer film, but not by way of limitation, is cellophane.

Bonding material when used herein means an adhesive, preferably a pressure sensitive adhesive, or a cohesive. Where the bonding material is a cohesive, a similar cohesive material must be placed on the adjacent surface for bondingly contacting and bondingly engaging with the cohesive material. The term "bonding material" also includes materials which are heat sealable and, in this instance, the adjacent portions of the material must be brought into contact and then heat must be applied to effect the seal. The term "bonding material" also includes materials which are sonic sealable and vibratory sealable. The term "bonding material" when used herein also means a heat sealing lacquer which may be applied to the sheet of material and, in this instance, heat, sound waves, or vibrations, also must be applied to effect the sealing.

The term "bonding material" when used herein also means any type of material or thing which can be used to effect the bonding or connecting of the two adjacent portions of the material or sheet of material to effect the connection or bonding described herein. The term "bonding material" also includes ties, labels, bands, ribbons, strings, tape, staples or combinations thereof. Some of the bonding materials would secure the ends of the material while other bonding material may bind the circumference of the wrapper. Another way to secure the wrapping is to heat seal the ends of the material to another portion of the material. One way to do this is to contact the ends with an iron of sufficient heat to heat seal the material.

The term "bonding material" when used herein also means any heat or chemically shrinkable material, and static electrical or other electrical means, magnetic means, mechanical or barb-type fastening means or clamps, curl-type characteristics of the film or materials incorporated in the sheet of material which can cause the material to take on certain shapes, and any type of welding method which may weld portions of the sheet to itself.

Varying bonding characteristics as used herein means less adhesion or cohesion of portions of the bonding material, that is, less "tack" of portions of the bonding material.

Release Material as used herein means a material capable of reducing the tacky properties of a bonding material when the release material is disposed in a covering position over the bonding material and which does not adversely effect the binding characteristics of the bonding material to the sheet of material when the sheet of material is wrapped about a floral arrangement. Release materials satisfying the above requirements are well known and include wax and other commercially available release agents such as Release Coat No. 30 marketed by the Michelman Company of Cincinnati, Ohio and an aqueous silicone admixture containing about 14 weight percent "Syl-off 1171" (a silicone containing composition marketed by Dow Corning Co. of Midland, Mich.), about 0.7 weight percent "Syl-off 1171A (a silicone containing composition markets by Dow Corning Co. of Midland, Mich.) and about 2 weight percent carboxymethyl cellulose.

Band when used herein means any material which may be secured about sheet of material disposed about a floral arrangement and includes elastic or non-elastic string or an elastic piece of material, a non-elastic piece of material, a round piece of material, a flat piece of material, a ribbon, a piece of paper strip, a piece of plastic strip, a piece of wire, a tie wrap or a twist tie or combinations thereof or any other device capable of gathering the sheet of material to removably or substantially permanently form a crimped portion and secure the crimped portion formed in the sheet of material which may be secured about a floral arrangement. The band also may include a bow if desired in a particular application. Such a band may be included as a part of the pull tab (described below) or may comprise the pull tab, however, the pull tab may not comprise a band, and the pull tab may be used without a band attached thereto as well.

Pull tab as used herein means a portion of a sheet of material, near an outer periphery of the sheet of material, preferably near at least one side of the sheet of material, wherein the sheet of material may be easily grasped by an operator (between the operators fingers, or between the operator's thumb and at least one finger) and lifted and unwrapped from itself and the floral arrangement.

Pull indicia as used herein means symbols, such as arrows, or a small picture of the lifted edge of a sheet of material, or a round dot, circle, square, or the like, or printed words, such as "pull," "pull here," "lift here," "lift to release," "lift," or any symbol or words which would indicate that the sheet of material could be unwrapped by starting at that specific point, or any combination of words and/or symbols.

Cling Wrap or Material when used herein means any material which is capable of connecting to the sheet of material and/or itself upon contacting engagement during the wrapping process and is wrappable about an item whereby portions of the cling material contactingly engage and connect to other portions of the wrapping material for generally securing the sheet of material wrapped about at least a portion of the item. This connecting engagement is preferably temporary in that the wrapping material may be easily removed without tearing same, i.e., the cling material "clings" to the wrapping material. A wrapping material which remains securely connected to and about the wrapped item until the wrapping material is torn therefrom.

The cling material is constructed and treated if necessary, from polyethylene such as Cling Wrap made by Glad®, First Brands Corporation, Danbury, Conn. The thickness of the cling material will, in part, depend upon the thickness of the sheet of material utilized, i.e., generally, the thicker and therefore heavier sheet of material may require a thicker and therefore stronger cling material. The cling material will range in thickness from less than about 0.2 mils to about 10 mils, and preferably less than about 0.6 mils to about 2.5 mils and most preferably from less than about 0.6 mils to about 2 mils. However, any thickness of cling material may be utilized in accordance with the present invention which permits the cling material to function as described herein. It will be appreciated that the pull tab (described in detail below), the sheet of material, or any portion of either, may comprise cling material.

BACKGROUND

Floral arrangements are usually wrapped in a wrapping material to protect the delicate blooms and foliage from damage. The wrapping material utilized frequently has some bonding material thereon, such as an adhesive or cohesive, so that the wrapping material retains its wrapped shape, and securely encompasses the floral arrangement in order to protect it. This type of wrapping material, however, has its disadvantages.

A significant disadvantage occurs when the wrapping material is removed from the floral arrangement. Frequently, it is not obvious where the wrapping material begins or ends. When this occurs, the recipient of the floral arrangement may become frustrated in looking for the edge of the wrapping material, and may, in a state of frustration, tear the wrapping material away from the delicate floral arrangement, damaging the blooms, foliage, or both. A further disadvantage is that, even when it is obvious where the wrapping material begins and ends, it is difficult to release the bonding material which holds the wrapping material about the floral arrangement. The recipient may again inadvertently damage the blooms and/or foliage of the floral arrangement in his/her struggle to lift and release a portion of the bonded wrapping material from itself. As a result, again, damage to the floral arrangement is likely. Such damage interferes with the recipient's enjoyment of the beauty and visual quality of the gift of a floral arrangement.

The present invention contemplates a wrapping material which has a bonding material thereon (the bonding material being described in detail below) which enhances the ability to wrap a floral arrangement. The present invention also contemplates a wrapping material which is readily removed, that is, a wrapping material which also has a pull tab and pull indicia which permits the edge of the wrapping material to be identified, and which permits the bonding material to be more readily released from the wrapping material, so that the wrapping material can be quickly and easily removed from the floral arrangement without causing damage to the delicate and fragile blooms and foliage. The present invention also contemplates crimping of the wrapping near the stem end of a floral arrangement, that is, crimping the wrapping material after it is rolled about a floral arrangement and formed into a wrapping/wrapper. Either the bonding material, the pull tab, a band or a combination thereof act to crimp the wrapping/wrapper about the floral arrangement, and retain the wrapping/wrapper thereabout in a crimped condition.

The Embodiment of FIGS. 1-2

Referring to FIGS. 1 and 2, designated generally by the reference numeral 10 is a wrapping material which is constructed in accordance with the present invention. The wrapping material 10 comprises at least one sheet of material 12. The sheet of material 12 has an upper surface 14, a lower surface 16 (one edge of the sheet material lifted for illustration purposes only), and an outer periphery 18. The outer periphery 18 of the sheet of material 12 further comprises a first side 20, a second side 22, a third side 24, and a fourth side 26. The sheet of material 12 also has a pull tab 28 and pull indicia 30, which are described in detail below.

The sheet of material 12 is utilized to wrap a floral arrangement 32 (FIG. 6). The floral arrangement 32 comprises a flower portion 34 which may comprise either a bloom or a foliage portion, and the floral arrangement 32 also comprises a stem portion 36. However, it will be appreciated that the floral arrangement 32 may consist of only a single bloom or only foliage (not shown). It will be understood that the term "floral arrangement" is used herein interchangeably with the term "floral grouping."

In the embodiment of FIG. 1, the sheet of material 12 is square. It will be appreciated, however, that any shape or size of sheet of material 12 may be used to wrap a floral arrangement 32 as long as it is sufficiently sized and shaped to wrap and encompass the floral arrangement 32. For example, the sheet of material 12 may also comprise other geometric and non-geometric shapes. When multiple sheets of material 12 are used together, they may be connected together or laminated, or may comprise separate layers. Finally, it will be appreciated that the sheet of material 12 shown in all embodiments herein is substantially flat. The sheet of material 12 may be constructed of a single sheet of material 12 or a plurality of sheets of material 12. Any thickness of the sheet of material 12 may be utilized in accordance with the present invention as long as the sheet of material 12 may be wrapped about a floral arrangement 32 and removed from the floral arrangement 32, as described herein. Typically the sheet of material 12 has a thickness in a range of less than about 0.2 mils to about 30 mils. In one embodiment, the sheet of material 12 is constructed from one sheet of polymer film having a thickness in a range of from less than about 0.5 mils to about 2.5 mils. In an alternate embodiment, the sheet of material is constructed from polymer film having a thickness in a range of from less than about 0.2 mils to about 10 mils.

The sheet of material 12 is constructed from any suitable material that is capable of being wrapped about a floral arrangement 32. Preferably, the wrapping material 10 comprises paper (untreated or treated in any manner), cellophane, foil, polymer film, fiber (woven or non-woven or synthetic or natural), cloth (woven or non-woven or natural or synthetic), burlap, or any combination thereof.

The sheet of material 12 may vary in color. Further, the sheet of material 12, may consist of designs which are printed, etched, and/or embossed; in addition, the sheet of material 12 may have various colorings, coatings, flockings, and/or metallic finishes, or be characterized totally or partially by pearlescent, translucent, transparent, iridescent, or the like characteristics. Each of the above-named characteristics may occur alone or in combination. Moreover, each surface of the sheet of material 12 may vary in the combination of such characteristics.

The sheet of material 12 has a width 38 (FIG. 1) extending generally between the first side 20 and the second side 22, respectively, sufficiently sized whereby the sheet of material 12 can be wrapped about and substantially surrounded and compass a floral arrangement 32. The sheet of material 12 has a length 40 (FIG. 1) extending generally between the third side 24 and the fourth side 26, respectively, sufficiently sized whereby the sheet of material 12 extends over a substantial portion of the floral arrangement 32 when the sheet of material 12 has been wrapped about the floral arrangement 32 in accordance with the present invention shown and described in detail herein.

The sheet of material may further comprise an ink, dye, and/or pigment (not shown). Such inks, dyes, and pigments are known in the art, and are commercially available, and may be disposed upon or incorporated in the sheet of material 12 by any method described herein or known in the art. For example, the ink, dye, or pigment may form a portion of a design or decoration on the sheet of material, such as flowers, leaves, and the like.

The sheet of material 12 also comprises a bonding material 42. The bonding material 42 may comprise varying bonding characteristics when disposed on certain portions of the sheet of material 12 so that the bonding material 42 may have less bonding characteristics or tack at or near the pull tab 28.

Further, the bonding material 42 may also comprise at least one color derived from dye, ink, and/or pigment, as previously described herein. Bonding materials as described above, are known in the art and commercially available.

A bonding material 42 is disposed upon the sheet of material 12, i.e., on the upper surface 14, the lower surface 16, or a combination thereof. The bonding material 42, as previously described, is preferably a pressure sensitive adhesive. Such use of adhesives, and particularly pressure sensitive adhesives is taught in U.S. Pat. No. 5,111,638, entitled, "Method For Wrapping An Object With A Material Having Pressure Sensitive Adhesive Thereon," which is hereby incorporated by reference herein.

The sheet of material used herein may further comprise at least one scent (not shown). Examples of scents utilized herein include (but are not limited to) floral scents (flower blossoms, or any portion of a plant), food scents (chocolate, sugar, fruits), herb or spice scents (cinnamon), and the like. Additional examples of scents include flowers (such as roses, daisies, lilacs), plants (such as fruits, vegetables, grasses, trees), foods (for example, candies, cookies, cake), food condiments (such as honey, sugar, salt), herbs, spices, woods, roots, and the like, or any combination of the foregoing. Such scents are known in the art, and are commercially available.

The scent may be disposed upon the sheet of material 10 by spraying the scent thereupon, painting the scent thereupon, brushing the scent thereupon, lacquering the scent thereupon, immersing the sheet of material in a scent-containing liquid, exposing the sheet of material to scent-containing gas, or any combination thereof.

The scent may be contained within a lacquer, or other liquid, before it is disposed upon the sheet of material 10. The scent may also be contained within a dye, ink, and/or pigment (not shown). Such dyes, inks and pigments are known in the art, and are commercially available, and may be disposed upon or incorporated in the sheet of material 10 by any method described herein or known in the art.

The sheet of material 12 comprises a pull tab 28 and pull indicia 30. The pull tab 28 permits at least one of the operator's fingers to be slipped under the pull tab 28 in order to grasp the pull tabs 28 and pull one portion of the sheet of material 12 away from at least one other portion of the sheet of material 12. The pull tab 28 may be located near any side, or multiple pull tabs may be located near one side or multiple sides of the sheet of material 12, as long as the pull tab 28 may be easily grasped and lifted away from the wrapped sheet of material 12, thereby causing the sheet of material 12 to unwrap from around itself and the floral arrangement 32, thereby gently releasing the floral arrangement from the wrapping material 10.

The pull tab 28 may form a portion of the sheet of material 12, or the pull tab 28 may form a die-cut extension of the sheet of material 12. Further, the pull tab 28 may comprise an integral portion of the sheet of material 12, or may form a small second separate sheet of material 12 which may be separately attached, either after the sheet of material 12 has been constructed (not shown), or after the sheet of material 12 has been wrapped about a floral arrangement 32 (not shown). Located at or near the pull tab 28 is pull indicia 30.

For example, FIG. 1 shows a pull tab with the word "Pull" printed in the corner of the sheet of material 12 indicating that removal of the sheet of material 12 from the floral arrangement 32 is to be initiated at that point. That is, the pull tab 28 is located in the area designated by the pull indicia 30, and the pull tab 28 may be grasped to initiate the removal of the sheet of material 12 from the floral arrangement 32.

The pull tab 28 and/or the pull indicia 30 may be located on any portion of the sheet of material 12 having a bonding material 42 thereon (FIG. 20), or, alternatively, may be located in an area without bonding material 42 (FIG. 1). When the pull tab 28 is located on bonding material 42, the bonding material at the location of the pull tab 28 has less "tack" or bonding, as previously described, than the remainder of the bonding material 42 disposed on the sheet of material 12.

The sheet of material 12 shown in FIGS. 1-2 shows the use of a pull tab 28 and pull indicia 30 near the corner junction of the first side 20 and the third side 24 of the sheet of material 12. The bonding material 42 does not extend into this junction, thereby forming a non-bonded area for the pull tab 28. Disposed on the pull tab 28 is pull indicia 30 comprising a square, with the word "Pull" printed in the square (the word "pull" appears backwards in FIG. 1, because when wrapped, the lower surface 16, as shown in FIG. 2, would be exposed, thus exposing the pull indicia 30 "Pull" correctly).

It will be appreciated that more than one pull tab area may be disposed upon the sheet of material. Further, more than one change in bonding characteristics that is, the bonding or "tack" of the bonding material, as described above, may be disposed upon the sheet of material (not shown).

The Embodiment of FIG. 3

Illustrated in FIG. 3 is a modified material 10a which is constructed exactly like the material 10 shown in FIGS. 1-2, and described in detail previously, except that the sheet of material 12a comprises a plurality of sheets of material 12a connected together to form a pad 44 of sheets of material 12a. The pad 44 comprises a plurality of sheets of material 12a stacked one on top of the other and positioned so that the periphery 18a, that is, the first sides 20a, the second sides 22a, the third sides 24a, and the fourth sides 26a of the sheets of material 12a in the pad 44 generally are aligned.

Referring to FIG. 3, the pad 44 further comprises a top sheet of material 46 and a next sheet of material 48 disposed thereunder, the other sheets of material 12a being disposed under the next sheet of material 48 in the pad 44 of the sheets of material 12a. Each sheet of material 12a in the pad 44 may have a bonding material 42a (not shown) disposed thereupon, near at least a portion of the periphery 18a of each sheet of material 12a, and each sheet of material 12a having a bonding material 42a thereon is bondingly connectable to a portion of another sheet of material 12a for cooperating to connect the sheets of material 12a into the pad 44.

The top sheet of material 46 is capable of being disconnected from the pad 44 of sheets of material 12a. When the top sheet of material 46 is disconnected, the next sheet of material 48 forms the new top sheet of material 46, and the sheet of material 12a lying under the new top sheet of material 46 forms a new next sheet of material 48.

A bonding material 42a is disposed on each sheet of material 12a in the pad 44 and bondingly and releasably connects each sheet of material 12a to one other sheet of material 12a in the pad 44 whereby one of the sheets of material 12a can be releasably disconnected from another sheet of material 12a by pulling the sheets of material 12a apart. Further, the bonding material 42a bondingly and releasably connects each sheet of material 12a to portions of itself.

The Embodiment of FIGS. 4-5

Illustrated in FIGS. 4-5 is a modified material 10b which is constructed exactly like the material 10 shown in FIGS. 1-2 and described in detail previously except that the material 10b comprises a roll 50 of sheets of material 12b contained within a dispenser 52, as shown in FIG. 4. The roll 50 contains a material 10b comprising a plurality of sheets of material 12b in the roll 50, the sheets of material 12b being connected by perforations 51b to form the roll 50 (the sheet of material 12b shown partially detached and turned upward for illustration purposes only). Such a roll 50 may be provided without a dispenser 52 as well, as shown in FIG. 5. Such rolls 50 permit one sheet of material 12b to be withdrawn from the roll 50, and the sheet of material 12b is detached or severed from the roll 50. Alternatively, the roll 50 may simply be formed as a continuous roll 50 without perforations, and the wrapping material 10b may be withdrawn from the roll 50 and a portion may be severed into separate sheets of material 12b by serrated cutting edge (not shown) contained within the dispenser 52, or by a separate cutting element (not shown). Any number of sheets of material 12b may form the roll 50 as long as it is possible to withdraw at least one sheet of material 12b from the roll 50. It will be understood therefore that the roll 50 may comprise only one sheet of material 12b, without the dispenser 52 (not shown).

The Method Of Use of FIGS. 6-11

FIGS. 6-11 illustrate one method of use of the present invention. The wrapping material 10a and the sheet of material 12a illustrated in this embodiment and used in this method are constructed exactly the same as the wrapping material 10a and the sheet of material 12a in FIG. 3 and described in detail previously.

In a general method of use, a floral arrangement 32 is placed on the top sheet of material 46, the sheet of material 12a being sized to wrap about and substantially surround and encompass the floral arrangement 32. The sheet of material 12a is wrapped about the floral arrangement 32, the sheet of material 12a simultaneously disconnecting from the pad 44 of sheets of material 12a as the sheet of material 12a is wrapped about the floral arrangement 32. A portion of the sheet of material 12a, such as the second side 22a of the sheet of material 12a, overlaps at least one other portion of the sheet of material 12a. The overlapping portions of the sheet of material 12a are bonded to the sheet of material 12a by their contact with the bonding material 42a on the upper surface 14a of the sheet of material 12a which bondingly contacts and engages the overlapped portions of the sheet of material 12a, whereby the second side 22a of the sheet of material 12a is bonded to overlapping portions of the sheet of material 12a generally between the third side 24a and the fourth side 26a of the sheet of material 12a whereby there are no loose flaps formed by unbonded portions of the sheet of material 12a. The sheet of material 12a substantially encompasses and surrounds a substantial portion of the flower portion 34 of the floral arrangement 32. The sheet of material 12a is held about the floral arrangement 32 by the bonding contact of the overlapping portions of the sheet of material 12a, the sheet of material 12a being tightly wrapped about the stem portion 36 of the floral arrangement 32. The sheet of material 12a wrapped about the floral arrangement 32 forms a cylindrically-shaped wrapping 70 (FIG. 9), or, alternatively, a conically-shaped wrapping 70 (FIG. 14), or, in further alternatives, may form any geometric, non-geometric, or asymmetrical shaped wrapping 70. Both shapes of wrapping 70 shown herein have an opening extending through a lower end 54 thereof and an opening extending through the upper end 56 thereof with the stem portion 36 of the floral arrangement 32 extending through the opening in the lower end 54 and the flower portion 34 of the floral arrangement 32 being exposed near the opening in the upper end 56 thereof, the upper end 56 of the wrapping 70 being loosely wrapped about the flower portion 34 of the floral arrangement 32.

FIGS. 6–11 show one specific method of use. A plurality of sheets of material 12a in a pad 44, and a floral arrangement 32, as described above, are provided. The floral arrangement 32 is disposed on the top sheet of material 46 on the pad 44 of sheets of material 12a. An operator then lifts a portion of the top sheet of material 46 (generally the portion near the second side 22a) and places the lifted portion over a portion of the floral arrangement 32, as shown in FIG. 7. In this position, the top sheet of material 46 is rolled over the floral arrangement 32, and the top sheet of material 46 and the floral arrangement 32 are rolled in a general direction 58 (FIGS. 7–8) whereby the top sheet of material 46 and the floral arrangement 32 contained therein are lifted from the next sheet of material 48 (FIG. 9), the floral arrangement 32 being rolled into the top sheet of material 46, thereby rolling the top sheet of material 46 generally about the floral arrangement 32 and containing and substantially encompassing the floral arrangement 32 within the top sheet of material 46.

The top sheet of material 46 and the floral arrangement 32 contained therein are continued rolled in a rolling direction 60 and in the direction 58 generally toward the first side 20a of the top sheet of material 46 until the floral arrangement 32 is disposed generally adjacent the first side 20a of the top sheet of material 46, as shown in FIG. 8. In this position, the operator continues to roll the top sheet of material 46 and the floral arrangement 32 disposed thereon in the rolling direction 60 and in the general direction 58 thereby lifting the top sheet of material 46 from the next sheet of material 48 and releasing the top sheet of material 46 from the bonding material 42a disposed on the next sheet of material 48, the next sheet of material 48 generally beneath the top sheet of material 46 and simultaneously disconnecting the top sheet of material 46 from the bonding material 42a connection between the top sheet of material 46 and the next sheet of material 48. The adjacent upper surface 14a of the second side 22a of the top sheet of material 46 is then bondingly connected to the bonding material 42a on the upper surface 14a of the top sheet of material 46 near the first side 20a, thereby securely wrapping the floral arrangement 32, as shown in FIG. 9, the method of wrapping permitting the pull tab 28a and pull indicia 30a on the top sheet of material 46 to be readily visible on the wrapped floral arrangement 32.

When the top sheet of material 46 has been secured about the floral arrangement 32 in the manner just described, the next sheet of material 48, generally under the top sheet of material 46, then provides a new top sheet of material 46, the sheet of material 12a under the new top sheet of material 46 providing a new next sheet of material 48, and the process can be repeated for wrapping additional or other floral arrangements 32.

Such a method of wrapping is shown and described in detail in U.S. Pat. No. 5,181,364, entitled, "Wrapping a Floral Grouping With Sheets Having Adhesive Or Cohesive Material Applied Thereto," which issued Jan. 26, 1993. U.S. Pat. No. 5,181,364 is specifically incorporated by reference herein.

In the wrapped condition with the sheet of material 12 wrapped about the floral arrangement 32, the wrapped sheet of material 12 forms a "wrapping" or "wrapper" 70. Further, it will be understood that the terms "wrapping" and "wrapper" are used interchangeably herein. The wrapper 70, when formed, permits both the stem portion 36 of the floral arrangement 32 to extend through the opening in the lower end 54 of the wrapper 70 and the bloom portion 34 of the floral arrangement to extend through the opening in the upper end 56 of the wrapper 70.

FIGS. 10 and 11 show a method of removing the sheet of material 12a from the wrapped floral arrangement 32. The pull tab 28a and pull indicia 30a are located in a position on the wrapped sheet of material 12a which is easily visible to the operator. The operator grasps the pull tab 28a between his fingers (or between his thumb and at least one finger, by placing at least one finger on one surface of the pull tab 28a and at least one other finger on one other surface of the pull tab 28a), and pulls the portion of the sheet of material 12a surrounding the pull tab 28a away from the underlying portion of the sheet of material 12a that it overlapped and was bonded to. The bonding material 42a readily releases the portion of the sheet of material 12a surrounding the pull tab 28a from the underlying portion of the sheet of material 12a lying directly thereunder, thus permitting quick and easy removal of the sheet of material 12a from the floral arrangement 32, said removal being accomplished without causing damage to the delicate floral arrangement 32.

The Embodiment And Method Of Use Of FIGS. 12–16

FIGS. 12–16 illustrate another embodiment and method of use of the present invention. The wrapping material 10c and sheet of material 12c illustrated in this embodiment and used in this method are constructed exactly the same as the wrapping material 10 and the sheet of material 12 shown in FIGS. 1–2 and described in detail previously, except that the sheet of material 12c is not transparent, the pull indicia 30c comprises both the word "Pull" and an arrow symbol pointing to the corner junction of the first side 20c and the third side 24c of the sheet of material 12c, and the pull indicia 30c is printed on the lower surface 16c of the sheet of material 12c.

A floral arrangement 32c is disposed upon the sheet of material 12c, in the same manner shown in FIGS. 6–11 and described in detail previously for the method of use of wrapping material 10a and the sheet of material 12a, except that a single sheet of material 12c is utilized, and the wrapping material 10c forms generally a conical-shaped wrapper 70c. The sheet of material 12c is unwrapped from the floral arrangement 32c in exactly the same manner as shown herein and described in detail previously.

The Embodiment and Method of Use of FIG. 17

FIG. 17 illustrates another embodiment of the present invention. The wrapping material 10d and sheet of material 12d illustrated in this embodiment and used in this method are constructed exactly the same as the wrapping material 10 and the sheet of material 12 shown in FIGS. 1–2 and described in detail previously, except that the sheet of material 12d has a pull indicia 30d of a circle with an arrow pointing to the corner junction of the first side 20d and the third side 24d of the sheet of material 12d.

A floral arrangement 32d (not shown) is disposed upon the sheet of material 12d in the same manner shown in FIGS. 6–11 and described in detail previously for the method of use of wrapping material 10a and the sheet of material 12a; however, it will be appreciated that any method of use shown or described herein may be utilized. The sheet of material 12d is unwrapped from a floral arrangement 32d (not shown) in exactly the same manner as shown herein and described in detail previously.

The Embodiment and Method of Use of FIG. 18

FIG. 18 illustrates another embodiment of the present invention. The wrapping material 10e and sheet of material 12e illustrated in this embodiment and used in this method are constructed exactly the same as the wrapping material 10 and the sheet of material 12 shown in FIGS. 1–2 and described in detail previously, except that the sheet of material 12e has a first pull tab 28e and a second pull tab 28ee, a first pull indicia 30e and a second pull indicia 30ee, the first pull indicia 30e being disposed near the first pull tab 28e, and the second pull indicia 30ee being disposed near the second pull tab 28ee, the first pull tab 28e and pull indicia 30e being located near the corner junction of the first side 20e and the third side 24e of the sheet of material 12e, the second pull tab 28ee and pull indicia 30ee being located near the corner junction of the first side 20e and the fourth side 26e, the first pull indicia 30e comprising a circle with an arrow pointing to the corner junction of the first side 20e and the third side 24e of the sheet of material 12e, the second pull indicia 30ee comprising a circle with an arrow pointing to the corner junction of the first side 20e and the fourth side 26e of the sheet of material 12e.

A floral arrangement 32e (not shown) is disposed upon the sheet of material 12e in the same manner shown in FIGS. 6–11 and described in detail previously for the method of use of wrapping material 10a and the sheet of material 12a; however, it will be appreciated that any method of use shown or described herein may be utilized. The sheet of material 12e is unwrapped from a floral arrangement 32e (not shown) in exactly the same manner as shown herein and described in detail previously, except that either the first pull tab 28e may be used to unwrap the floral arrangement 32e, or the second pull tab 28ee may be used, or both the first pull tab 28e and the second pull tab 28ee may be utilized to remove the sheet of material 12e from the floral arrangement 32e, in either a concurrent or sequential manner.

The Embodiment and Method of Use of FIG. 19

FIG. 19 illustrates another embodiment of the present invention. The wrapping material 10f and sheet of material 12f illustrated in this embodiment and used in this method are constructed exactly the same as the wrapping material 10 and the sheet of material 12 shown in FIGS. 1–2 and described in detail previously, except that the sheet of material 12f has a bonding material 42f strip which extends near the entire length of the first side 20f, that is, from the third side 24f to the fourth side 26f, the pull tab 28f and pull indicia 30f being disposed on either side of the bonding material 42f strip and near the third side 24f, with the pull indicia 30f "Pull" on one side of the bonding material 42f, and the pull indicia 30f symbol of an arrow disposed on the other side of the bonding material 42f, that is, near to and pointing to the corner junction of the first side 20f and the third side 24f of the sheet of material 12f.

A floral arrangement 32f (not shown) is disposed upon the sheet of material 12f in the same manner shown in FIGS. 6–11 and described in detail previously for the method of use of wrapping material 10a and the sheet of material 12a; however, it will be appreciated that any method of use shown or described herein may be utilized. The sheet of material 12f is unwrapped from a floral arrangement 32f (not shown) in exactly the same manner as shown herein and described in detail previously.

The Embodiment and Method of Use of FIG. 20

FIG. 20 illustrates another embodiment of the present invention. The wrapping material 10g and sheet of material 12g illustrated in this embodiment and used in this method are constructed exactly the same as the wrapping material 10 and the sheet of material 12 shown in FIGS. 1–2 and described in detail previously, except that the sheet of material 12g has a bonding material 42g strip which extends the entire length of the sheet of material 12g near the first side 20g, from the third side 24g to the fourth side 26g, the pull tab 28g and pull indicia 30g being near the end of the bonding material 42g strip, that is, near the third side 24g of the sheet of material 12g and near the corner junction of the first side 20g and the third side 24g of the sheet of material 12g, the bonding characteristics or "tack" of the bonding material 42g being decreased, as described previously, at the site of the pull tab 28g and pull indicia 30g to enhance an operator's ability to grasp the pull tab 28g and remove the sheet of material 12g from a floral arrangement 32g.

A floral arrangement 32g (not shown) is disposed upon the sheet of material 12g in the same manner shown in FIGS. 6–11 and described in detail previously for the method of use of wrapping material 10a and the sheet of material 12a; however, it will be appreciated that any method of use shown or described herein may be utilized. The sheet of material 12g is unwrapped from a floral arrangement 32g (not shown) in exactly the same manner as shown herein and described in detail previously, except that, in a further alternative, the sheet of material 12g may be removed from the floral arrangement 32g by the operator first inserting a finger (or fingers) under the pull tab 28g on the outer wrapped layer of the sheet of material 12g at the point indicated by the pull indicia 30g to grasp the pull tab 28g for removal of the sheet of material 12g.

The Embodiment and Method of Use of FIG. 21

FIG. 21 illustrates still another embodiment of the present invention. The wrapping material 10h and sheet of material 12h illustrated in this embodiment and used in this method are constructed exactly the same as the wrapping material 10 and the sheet of material 12 shown in FIGS. 1–2 and described in detail previously, except that the sheet of material 12h is die-cut into a trapezoidal shape and has a scalloped design cut into the third side 24h of the sheet of material 12h, the bonding material 42h is a strip of bonding material 42h which is disposed generally between the first side 20h and the second side 22h of the sheet of material 12h, the bonding material 42h disposed near the fourth side 26h, and the pull tab 28h has been die-cut as an extension of the sheet of material 12h, and the pull tab 28h has pull indicia 30h represented as an arrow thereon. The pull tab 28h is situated slightly above the bonding material 42h, on the first side of the sheet of material 12h and near the corner junction of the first side 20h and the fourth side 26h of the sheet of material 12h.

A floral arrangement 32h (not shown) is disposed upon the sheet of material 12h in the same manner shown in FIGS.

6–11 and described in detail previously for the method of use of wrapping material 10a and the sheet of material 12a, however, it will be appreciated that any method of use shown or described herein may be utilized. The sheet of material 12h is unwrapped from a floral arrangement 32h in exactly the same manner as shown herein and described in detail previously.

The Embodiment and Method of Use of FIGS. 22–25

FIGS. 22–25 illustrate still another embodiment of the present invention and method of use of the present invention. The wrapping material 10i and sheet of material 12i illustrated in this embodiment and used in this method are constructed exactly the same as the wrapping material 10h and the sheet of material 12h shown in FIG. 21 (wrapping material 10h and sheet of material 12h being exactly like FIGS. 1–2 and described in detail previously, except for the differences described above) except that, as shown in FIG. 22, the pull tab 28i is die-cut adjacent the bonding material strip 42i, the pull tab 28i being located on the first side 20i of the sheet of material 12i and in the corner junction of the first side 20i and the fourth side 26i of the sheet of material 12i.

A floral arrangement 32i is disposed upon the sheet of material 12i in the same manner shown in FIGS. 6–11 and described in detail previously for the method of use of wrapping material 10a and the sheet of material 12a , however, it will be appreciated that any method of use shown or described herein may be utilized (FIG. 23). The sheet of material 12i is unwrapped from a floral arrangement 32i in exactly the same manner as shown herein and described in detail previously, as shown in FIGS. 24–25.

The Embodiment and Method of Use of FIGS. 26–29

FIGS. 26–29 illustrate still another embodiment of the present invention and method of use of the present invention. The wrapping material 10j and sheet of material 12j illustrated in this embodiment and used in this method are constructed exactly the same as the wrapping material 10h and the sheet of material 12h shown in FIG. 21 (wrapping material 10h and sheet of material 12h being exactly like FIGS. 1–2 and described in detail previously, except for the differences described above).

A floral arrangement 32j is disposed upon the sheet of material 12j in the same manner shown in FIGS. 6–11 and described in detail previously for the method of use of wrapping material 10a and the sheet of material 12a; however, it will be appreciated that any method of use shown or described herein may be utilized. The method for wrapping the floral arrangement 32j with the sheet of material 12j differs somewhat from the previously described methods, in that the sheet of material 12j is crimped about the stem portion 36j of the floral arrangement 32j near the fourth side 26j of the sheet of material 12j, that is, in and around the area where the bonding material 42j is disposed. The crimping may be conducted as the floral arrangement 32j is wrapped (not shown), or the crimping may be conducted after the floral arrangement 32j is wrapped by crimping the sheet of material 12j in the area of the strip of bonding material 42j. Such crimping may be conducted by hand, by grasping and substantially encompassing with one or more hands the lower end of the wrapper 70j near the fourth side 26j of the sheet of material 12j, in the area of the strip of bonding material 42j, and evenly and firmly squeezing the sheet of material 12j about the area of the strip of strip of bonding material 42j, near the fourth side 26j of the sheet of material 12j, thereby pressing and gathering both the sheet of material 12j near the fourth end 26j against itself and against the stem portion 36j of the floral arrangement 32j and the bonding material 42j against itself and against the stem portion 36j of the floral arrangement 32j. The wrapper 70j may also be crimped by using both a crimping motion and a turning motion to create a twisted crimping, as illustrated in FIG. 28, resulting in a wrapper 70j which is both crimped, as described previously, and which is twisted about the stem portion 36j (the sheet of material 12j near the stem portion 36j being rotated between about one-eighth of a turn to about a full turn) primarily in the area near the stem portion 36j of the floral arrangement 32j. Such crimping as described above may also be conducted by any instrument or machine used for gathering or crimping packaging materials.

The pull tab 28j may extend over the crimped area, as shown in FIG. 27 to permit easy removal of the sheet of material 12j. Alternatively, the pull tab 28j may be at least partially tucked into the wrapper by folding the pull tab 28j toward the inside of the wrapper 70j (not shown) after the floral arrangement 32j has been wrapped and formed into a wrapper.

The sheet of material 12j is unwrapped from a floral arrangement 32i, as shown in FIG. 29, in exactly the same manner as shown herein and described in detail previously.

The Embodiment and Method of Use of FIGS. 30–32

FIGS. 30–32 illustrate still another embodiment of the present invention and method of use of the present invention. The wrapping material 10k and sheet of material 12k illustrated in this embodiment and used in this method are constructed exactly the same as the wrapping material 10h and the sheet of material 12h shown in FIG. 21 (wrapping material 10h and sheet of material 12h being exactly like FIGS. 1–2 and described in detail previously, except for the differences described above).

A floral arrangement 32k is disposed upon the sheet of material 12k in the same manner shown in FIGS. 6–11 and described in detail previously for the method of use of wrapping material 10a and the sheet of material 12a; however, it will be appreciated that any method of use shown or described herein may be utilized. The method for wrapping the floral arrangement 32k with the sheet of material 12k, as shown in FIGS. 31 and 32, differs somewhat from the previously described methods, in that the sheet of material 12k is crimped in a manner described in detail and shown previously in FIGS. 26–29, the only difference being that the pull tab 28k has a bonding material 42k at least partially disposed thereon, and the pull tab 28k is wrapped about the crimped portion of the wrapper 70k after the sheet of material 12k has been crimped, thereby further crimping the sheet of material 12k and restricting and retaining the sheet of material 12k in a crimped condition.

The wrapper 70k is caused to be more tightly wrapped about the floral arrangement 32k by grasping the pull tab 28k and pulling the pull tab 28k in a direction (not shown) about the lower end of the wrapper 70k. Once the pull tab 28k has been wrapped tightly about lower end of the wrapper 70k, the portion of the pull tab 70k having the bonding material 42k applied thereto is engagingly pressed against the wrapper 70k to affix the pull tab 28k to the wrapper 70k thereby causing the lower end of the wrapper 70k to be crimpingly wrapped about the stem portion 36k of the floral arrangement 32k for inhibiting the floral arrangement 32k from slipping or moving within the wrapper 70k.

In an alternative method (not shown), the pull tab 28k is elongated, and may have only a single spot of bonding material 42k thereon, and wraps completely around the wrapper 70k, the spot of bonding material 42k used to attach the pull tab 28k to itself after it is wrapped completely around the wrapper 70k. The pull tab 28k may be wrapped about the already crimped wrapper 70k, or, alternatively, the pull tab 28k may be utilized to both crimp the wrapper 70k in a crimped condition, as described above, as well as retain the wrapper 70k in a crimped condition.

In a further alternative method (not shown), the sheet of material 12k may have a bonding material 42k on the lower surface 16k, and the pull tab 28k may have no bonding material 42k thereon. The sheet of material 12k will then be crimped by any method previously described herein, and the pull tab 28k will extend about the crimped bonding material and will bond thereto, thereby retaining the wrapper 70k in a crimped condition.

The sheet of material 12k is unwrapped from a floral arrangement 32k in exactly the same manner as shown herein and described in detail previously.

The Embodiment and Method of Use of FIGS. 33–36

Referring now to FIG. 33, designated by the reference numeral 10m is a sheet of wrapping material constructed in accordance with the present invention. The wrapping material 10m comprises at least one sheet of material 12m having an upper surface 14m, a lower surface 16m (one edge of the sheet of material 12m being lifted for illustrative purposes only), and an outer periphery 18m. The outer periphery 18m of the sheet of material 12m further comprises a first side 20m, a second side 22m, a third side 24m and a fourth side 26m.

The sheet of material 12m is further characterized as having a width 38m (FIG. 33) extending generally between the first side 20m and the second side 22m, respectively. The sheet of material 12m is provided with a sufficient width 38m so that the sheet of material 12m can be wrapped about and substantially surround and encompass the floral arrangement 32. The sheet of material 12m also has a length 40m (FIG. 33) which extends generally between the third side 24m and the fourth side 26m, respectively. The sheet of material 12m is provided with a sufficient length 40m so that the sheet of material 12m extends over a substantial portion of the floral arrangement 32 when the sheet of material 12m has been wrapped about the floral arrangement 32 in accordance with the present invention shown and described in detail herein.

The sheet of material 12m can be constructed from any suitable material that is capable of being wrapped about the floral arrangement 32. Preferably, the sheet of material 12m comprises paper (untreated or treated in any manner), cellophane, foil, polymer film, fiber (woven or non-woven or synthetic or natural), cloth (woven or non-woven or natural or synthetic), burlap or any combination thereof.

The sheet of material 12m may vary in color. Further, the sheet of material 12m may consist of designs or other decorative surface ornamentations which are printed, etched and/or embossed; in addition, the sheet of material 12m may have various colorings, coatings, flockings and/or metallic finishes, or be characterized totally or partially by pearlescence, translucence, transparence, iridescence, or the like characteristics. Each of the above-named characteristics may occur alone or in combination. Moreover, each surface of the sheet of material 12m may vary in the combination of such characteristics.

The sheet of material 12m may further comprise an ink, dye, and/or pigment (not shown). Such inks, dyes and pigments are known in the art, and are commercially available, and may be disposed on or incorporated in the sheet of material 12m by any method described herein or known in the art. For example, the ink, dye or pigment may form a portion of a design or decoration on the sheet of material 12m, such as flowers, leaves and the like.

The thickness of the sheet of material 12m can vary widely and a sheet of material 12m of any thickness may be utilized in accordance with the present invention as long as the sheet of material 12m is wrappable about the floral arrangement 32, as described herein. Generally, however, the sheet of material 12m will have a thickness in the range of from about 0.1 mils to about 30 mils, preferably from about 0.2 mils to about 10 mils, and more preferably from about 0.5 mils to about 2.5 mils.

In the embodiment of FIG. 33, the sheet of material 12m is square. It will be appreciated, however, that the sheet of material 12m may be of any shape and size as long as the sheet of material 12m is sufficiently sized and shaped to wrap and encompass the floral arrangement 32 in accordance with the present invention. That is, the sheet of material 12m may be rectangular, circular, or any other geometric or non-geometric shape.

The sheet of material 12m may be constructed of a single sheet of material 12m or a plurality of sheets of the same or different materials. When multiple sheets of material are used, they may be the multiple sheets which may be connected together or laminated, or such sheets may comprise separate layers. Finally, it will be appreciated that the sheet of material 12m shown in FIGS. 33 and 39 is substantially flat.

A decorative pattern, such as a color and/or an embossed pattern, and/or other decorative surface ornamentation may be applied to the upper and/or lower surface 14m and 16m of the sheet of material 12m or portions thereof including, but not limited to, printed designs, coatings, colors, flocking, or metallic finishes. The sheet of material 12m may also be totally or partially clear or tinted transparent material.

The floral arrangement 32 comprises the flower portion 34 which may comprise either a bloom or a foliage portion, and the stem portion 36. As previously stated, the floral arrangement 32 may consist only of a single bloom or foliage (not shown) or a plurality of blooms and stems substantially as shown.

The sheet of material 12m also comprises a bonding material 42m. The bonding material 42m is disposed on the upper surface 14m of the sheet of material 12m so as to be disposed near the first side 20m thereof and extend substantially along the first side 20m between the third and fourth sides 24m and 26m, respectively, of the sheet of material 12m. The bonding material 42m is preferably a pressure sensitive adhesive and may comprise varying bonding characteristics so that the bonding material 42m may have less bonding characteristics or tack near the third and fourth sides 24m and 26m, respectively, of the sheet of material 12m so as to enhance removal of the sheet of material 12m when same has been wrapped about the floral arrangement 32 to provide a decorative covering therefor.

Further, the bonding material 42m may also comprise at least one color derived from dye, ink and/or pigment as previously described herein. Bonding materials as described above are known in the art and commercially available.

Shown in FIG. 34 is a band 60 constructed in accordance with the present invention. The band 60 has a first end 62 and a second end 64. The band 60 is an elongated, flat strip of flexible material having a rectangularly-shaped cross-section (FIG. 34). The band 60 preferably is constructed of any material capable of being wrapped about a portion of the sheet of material 12m in the manner described herein. Preferably, the band 60 is constructed of a material selected from a group of materials consisting of paper, metal foil, cloth (natural or synthetic), denim, burlap, polymer film or cling material or combinations thereof.

The thickness of the band 60 can vary widely but will generally have a thickness in the range of from about 0.1 mils to about 30 mils, preferably from about 0.1 mils to 5.0 mils. In one preferred embodiment, the band 60 is constructed of the same material as the material utilized in the construction of the sheet material 12m.

The band 60 has an upper surface 66 and a lower surface 68 (FIG. 35). A bonding material 70 is disposed on the upper surface 66 of the band 60. More particularly, a first bonding material 70a is disposed on the upper surface 66 of the band 60 near the first end 62 thereof; and a second bonding material 70b is disposed on the upper surface 66 of the band 60 near the second end 64 thereof.

In a general method of use, the floral arrangement 32 is angularly disposed on the upper surface 14m of the sheet of material 12m such that the stem portion 36 of the floral arrangement 32 overlays a portion of the bonding material 42m extending along the first side 20m of the sheet of material 12m substantially as shown.

To wrap the sheet of material 12m about the floral arrangement 32 to provide a decorative covering therefor, a corner 72 of the sheet of material 12m is lifted and wrapped around the floral arrangement 32. The floral arrangement 32 is then rolled in a rolling direction 74 toward the first side 20m of the sheet of material 12m, and thus towards the bonding material 42m until the floral arrangement 32 is disposed substantially adjacent the second side 20m of the sheet of material 12m and a portion of the first side 20m of the sheet of material 12m overlaps at least one other portion of the sheet of material 12m. The overlapping portions of the sheet of material 12 are then bonded by pressing lightly along the bonding material 42m so that the bonding material 42m on the upper surface 14m of the sheet of material 12m bondingly contacts and engages the overlapped portions of the sheet of material 12m, whereby the first side 20m of the sheet of material 12m is bonded to overlapping portions of the sheet of material 12m generally between the third side 24m and the fourth side 26m of the sheet of material 12m and a decorative covering 76 is formed about the floral arrangement 30 substantially as shown in FIG. 35. It should be noted that by providing the bonding material 42m along the first side 20m of the sheet of material 12m, no loose flaps are formed in the decorative covering 76 by unbonded portions of the sheet of material 12m.

The decorative covering 76 formed from the sheet of material 12m substantially encompasses and surrounds a substantial portion of the flower portion 34 and the stem portion 36 of the floral arrangement 32. The decorative covering 76 formed from the sheet of material 12m is held about the floral arrangement 32 by the bonding contact of the overlapping portions of the sheet of material 12m and the sheet of material 12m is generally tightly wrapped about the stem portion 36 of the floral arrangement 32. While the decorative covering 76 formed from the sheet of material 12m is depicted as a conically-shaped decorative covering (FIGS. 35 and 36), it should be understood that the sheet of material 12m can be wrapped about the floral arrangement 32 to form a substantially cylindrically-shaped decorative covering (not shown) or any other geometric, non-geometric or asymmetrical shaped decorative cover as may be desired and dictated by the shape of the sheet of material 12m.

Further, it should be understood that the position of the floral arrangement 32 on the sheet of material 12m can vary and will generally be dictated by the position of the flower portion of the floral arrangement 32 desired relative to an upper end 78 of the decorative covering 76.

The decorative cover 76 formed from the sheet of material 12m has an opening 80 extending through a lower end 82 thereof and an opening 84 extending through the upper end 78 thereof with the stem portion 36 of the floral arrangement 32 extending through the opening 80 in the lower end 82. The flower portion 34 of the floral arrangement 32 is enclosed by the decorative covering 74 such that the opening 84 in the upper end 78 of the decorative covering 74 extends a distance above the flower portion 34 of the floral arrangement 32 and the decorative covering 76 is loosely wrapped about the flower portion 34 of the floral arrangement 32 substantially as shown in FIG. 35.

Referring more specifically to FIGS. 36 and 37, once the sheet of material 12m is extended about the floral arrangement 32 to provide the decorative covering 76, the first end 62 of the band 60 is bondingly connected to a portion of the decorative covering 76 by disposing the upper surface 66 of the band 60 near the first end 62 thereof adjacent a portion of the decorative covering 76 disposed above the bloom portion 34 of the floral arrangement 32 and and bondingly connecting the first end 62 of the band 60 to the decorative covering via the first bonding material 70a. The band 60 is then extended about a portion of the decorative covering 76 such that the band 60 pulls or draws the decorative covering 76 inward towards a central portion and thereby forms a crimped portion 84 (FIG. 37) in the decorative covering 76. The second end 64 of the band 60 is then bondingly connected to either a portion of the band 60 or to a portion of the decorative covering 76 by disposing the second bonding material 70b adjacent either a portion of the band 60 or a portion of the decorative covering 76 for bondingly connecting the second end 64 of the band 60 to either the band 60 or to the decorative covering 74.

In the embodiment shown in FIG. 37, the crimped portion 84 extends circumferentially about the decorative covering 76 at a position above the flower portion 34 of the floral arrangement 32 whereas in the embodiment shown in FIG. 38, the crimped portion 84a extends circumferentially about the decorative covering 76 at a position below the flower portion 34 of the floral arrangement 32, i.e. about the stem portion 36 of the floral arrangement 32. It should be noted that the band 60 may be integrally formed with the sheet of material 12m rather than securing the first end 62 of the band 60 to the sheet of material 12m via the first bonding material 70a if desired in a particular application.

Referring now to FIG. 39, the decorative covering 76 is illustrated having the crimped portion 84 with the band 60 extending circumferentially about the decorative covering 76 at a position above the flower portion 34 of the floral arrangement 32 and a crimped portion 86 with a band 88 extending circumferentially about the decorative covering 76 at a position below the flower portion 34 of the floral group 32, i.e. about the stem portion 36 of the floral arrangement 32. As previously described with reference to FIGS. 36 and 37, the first end 62 of the band 60 is bondingly connected to the decorative covering 76 so as to be disposed above the flower portion 34 of the floral arrangement 32. The band 60 is then extended about the decorative covering 76 whereby the band 60 pulls or draws the decorative covering 76 inward toward a central portion and forms the crimped portion 84 in the decorative covering 76 above the flower portion 34 of the floral arrangement 32. The second end 64 of the band 60 is then bondingly connected to either a portion of the band 60 or to a portion of the decorative covering 76 via the bonding material 70b on the second end 64 of the band 60.

The first end (not shown) of the band 88 (which is identical in construction and function to the band 60) is bondingly connected to a portion of the decorative covering 76 disposed about the stem portion 36 of the floral arrangement 32. The band 88 is then extended about a portion of the decorative covering 76 such that the band 88 pulls or draws the decorative covering 76 inward towards a central portion and thereby forms the crimped portion 86 (FIG. 37) in the decorative covering 76 about the stem portion 36 of the floral arrangement 32. A second end 90 of the band 88 is then bondingly connected to either a portion of the band 88 or to a portion of the decorative covering 76 via a bonding material (not shown) for bondingly connecting the second end 90 of the band 88 to either the band 88 or to the decorative covering 76.

The crimped portion 86 extends circumferentially about the decorative covering 76 such that the crimped portion 86 extends about the stem portion 36 of the floral arrangement 32 substantially as shown in FIG. 38. Thus, the band 60 and the band 88, in combination with the crimped portions 84 and 86, secure the decorative covering 76 about the floral arrangement 32. It should be noted that one or both of the bands 60 and 88 may be integrally formed with the sheet of material 12m rather than securing the bands 60 and 88 to the sheet of material 12m as heretofore described if desired in a particular application.

Figure 40:
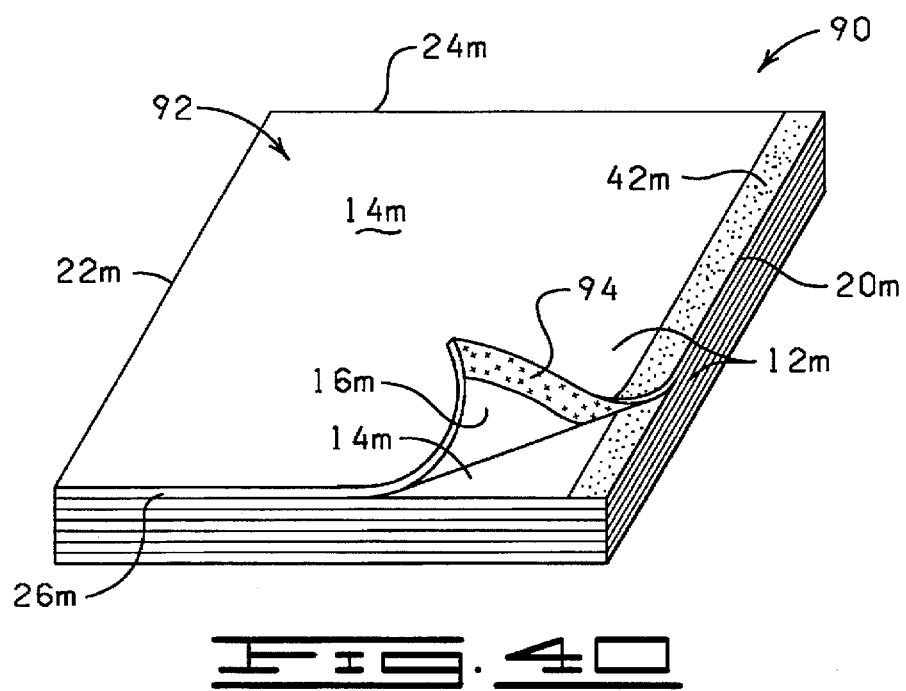
FIG. 40 is a perspective view of a floral arrangement having the sheet of material of FIG. 33 disposed thereabout and having one end of the band of FIG. 34 connected to the sheet of material so as to be extendable about a stem portion of the floral arrangement.

The present invention also contemplates a plurality of sheets of material 12m connected together to form a pad 90 of sheets of material 12m as shown in FIG. 40. The pad 90 comprises a plurality of sheets of material 12m stacked one on top of the other and positioned so that the first sides 20m, the second sides 22m, the third sides 24m and the fourth sides 26m of the sheets of material 12m in the pad 90 generally are aligned. The upper surface 14m of each sheet of material 12m is disposed generally adjacent the lower surface 16m of an adjacent sheet of material 12m in the pad 90. The bonding material 42m, which functions to connect the sheets of material 12m to form the pad 90 is also employed to bond the first side 20m of the sheet of material 12m to overlapping portions of the sheet of material 12m when the sheet of material 12m is wrapped about a floral arrangement 32. Thus, each of the sheets of material 12m in the pad 90 is releasably connected to the other sheets of material 12m via the bonding material 42m so that one or more sheets of the material 12m can be removed from the pad 90 by lifting one or more sheets of material 12m from the pad 90 and disconnecting the sheet of material 12m from the pad 90.

The sheets of material 12m are stacked in the form of the pad 90 thereby providing a top sheet of material 92 which is disposed generally on the top of the pad 90 with the other sheets of material 12m being disposed generally under the top sheet of material 92. To employ the top sheet of material 92 and/or one or more adjacently disposed sheets of the material 12m to wrap the floral arrangement 30 to provide a decorative cover about the floral arrangement 32, the floral arrangement 32 is positioned on the top sheet of material 92 in the same manner as heretofore described with reference to FIG. 33. A portion of the top sheet of material 92 generally near the second side 22m thereof is then lifted and the lifted portion of the top sheet of material 92 is positioned generally about a portion of the floral arrangement 32. In this position, the top sheet of material 29 and the floral arrangement 32 are rolled in a rolling direction 74 thereby rolling the top sheet of material 92 generally about the floral arrangement 32. The top sheet of material 92 and the floral arrangement 32 are continued to be rolled in the rolling direction 74 (FIG. 33) generally toward the first side 20m of the top sheet of material 92 until the floral arrangement 32 is disposed generally adjacent the first side 20m of the top sheet of material 92 in the same manner as described with reference to FIGS. 33 and 35.

As the floral arrangement 32 and the top sheet of material 92 are rolled over the bonding material 42m on the upper surface 14m of the top sheet of material 92, a release material 94 on lower surface 16m of the top sheet of material 92 enhances the disconnection of the top sheet of material 92 from the pad 90 and the bonding material 42m on the upper surface 14m of the top sheet of material 90 adhesively connects to an adjacent portion of the top sheet of material 90 thereby securing the top sheet of material 90 securely wrapped generally about the floral arrangement 30 so that no loose flaps are formed by unbonded portions of the top sheet of material 90.

When the top sheet of material 90 has been disposed and bondingly connected about the floral arrangement 32 in the manner just described, the sheet of material 12m generally under the top sheet of material 90 then provides a new top sheet of material 90 and the process can be repeated for wrapping additional or other floral arrangements. The floral arrangement 32 having a decorative cover formed from the top sheet of material 90 can then be provided with crimped portions by disposing one or more bands about the decorative covering in the manner heretofore described with reference to FIGS. 34-38 herein.

Changes may be made in the embodiments of the invention described herein, or in parts or elements of the embodiments described herein, or in the sequence of steps of the methods described herein, without departing from the spirit and/or scope of the invention as defined in the following claims.

What is claimed is:

1. A method for providing a decorative covering for a floral arrangement having a flower portion and a stem portion, comprising:

providing a sheet of material having an upper surface, a lower surface and an outer periphery;

providing a band having a first end and a second end and a bonding material disposed on at least a portion thereof, the first end of the band connected to the sheet of material;

extending the sheet of material about at least a portion of the floral arrangement such that a portion of the sheet of material extends about at least a portion of the stem portion, about the flower portion and extends a distance beyond the flower portion of the floral arrangement; and extending the band about the portion of the sheet of material extending beyond the flower portion of the floral arrangement so as to form a crimped portion in the sheet of material at a position beyond the flower portion of the floral arrangement and connecting the second end of the band to either a portion of the band or to the crimped portion of the sheet of material via the bonding material for securing the band in the position about the crimped portion of the sheet of material extending beyond the flower portion of the floral arrangement to provide a decorative covering for the floral arrangement.

2. The method of claim 1 wherein, in the step of providing the band, the band is further defined as being constructed of a flexible material selected from a group of materials consisting of paper, metal foil, cloth (natural or synthetic), denim, burlap, polymer film or cling material or combinations thereof.

3. The method of claim 1 wherein, in the step of providing the band, the band is further defined as having a thickness in a range from about 0.1 mils to about 30 mils.

4. The method of claim 3 wherein, in the step of providing the band, the band is further defined as having a thickness in a range from about 0.1 mils to about 5 mils.

5. A method for providing a decorative covering for a floral arrangement having a flower portion and a stem portion, comprising:

providing a sheet of material having an upper surface, a lower surface and an outer periphery;

providing a band having a first end and a second end and a bonding material disposed on at least a portion thereof, the first end of the band connected to the sheet of material;

extending the sheet of material about at least a portion of the floral arrangement such that a portion of the sheet of material extends about at least a portion of the stem portion, about the flower portion and extends a distance beyond the flower portion of the floral arrangement; and extending the band about the portion of the sheet of material extending about at least a portion of the stem portion of the floral arrangement so as to form a crimped portion in the sheet of material at a position adjacent at least a portion of the stem portion of the floral arrangement and connecting the second end of the band to either a portion of the band or to the crimped portion of the sheet of material via the bonding material for securing the band in the position extending about the crimped portion of the sheet of material, the crimped portion and the band cooperating to hold the sheet of material in the position extending about the floral arrangement so as to provide the decorative covering for the floral arrangement.

6. The method of claim 5 wherein, in the step of providing the band, the band is constructed of a flexible material selected from a group of materials consisting of paper, metal foil, cloth (natural or synthetic), denim, burlap, polymer film or cling material or combinations thereof.

7. The method of claim 6 wherein, in the step of providing the band, the band is further defined as having a thickness in a range from about 0.1 mils to about 30 mils.

8. The method of claim 7 wherein, in the step of providing the band, the band is further defined as having a thickness in a range from about 0.1 mils to about 5 mils.

9. A method for wrapping a floral arrangement, comprising:

providing a floral arrangement having a flower portion and a stem portion;

providing a sheet of material having an upper surface, a lower surface, and connecting means disposed on a portion of the sheet of material for connecting portions of the sheet of material to itself when wrapped about the floral arrangement;

providing at least one first band having a first end and a second end and a bonding material disposed on at least a portion thereof, the first end of the first band connected to the sheet of material;

extending the sheet of material about at least a portion of the floral arrangement such that a portion of the sheet of material extends about at least a portion of the stem portion, about the flower portion and extends a distance beyond the flower portion of the floral arrangement and a portion of the sheet of material having the connecting means disposed thereon overlaps another portion of the sheet of material resulting in overlapping portions which are connected together by the connecting means whereby the sheet of material substantially encompasses and surrounds a substantial portion of the stem portion of the floral arrangement forming a decorative wrapper about the floral arrangement, the decorative wrapper having an opening extending through a lower end thereof and an opening extending through an upper end thereof with a portion of the stem portion of the floral arrangement extending through the opening in the lower end and a portion of the flower portion of the floral arrangement being exposed near the opening in the upper end thereof; and extending the first band about the decorative wrapper so as to form a crimped portion in the decorative covering and connecting the second end of the first band to either a portion of the first band or to the crimped portion of the decorative covering via the bonding material for securing the first band in the position extending about the decorative covering, the crimped portion and the first band cooperating to hold the decorative covering in the position extending about the floral arrangement.

10. The method of claim 9 wherein, in the step of providing the first band, the first band is constructed of a flexible material selected from a group of materials consisting of paper, metal foil, cloth (natural or synthetic), denim, burlap, polymer film or cling material or combinations thereof.

11. The method of claim 10 wherein, in the step of providing the first band, the first band is defined further as having a thickness in a range from about 0.1 mils to about 30 mils.

12. The method of claim 11 wherein, in the step of providing the first band, the first band is defined further as having a thickness in a range from about 0.1 mils to about 5 mils.

13. The method of claim 9 further comprising:

providing at least one second band having a first end and a second end and a bonding material disposed on at least a portion thereof, the first end of the second band connected to the sheet of material at a position below the first band such that upon wrapping the sheet of material about the floral grouping the second band extends about the decorative covering extending about the stem portion of the floral arrangement and crimps the portion of the decorative covering extending about the stem portion of the floral arrangement, and connecting the second end of the second band to either a portion of the second band or a portion of the decorative covering via the bonding material for securing the second band in the position extending about the decorative covering and thereby retaining the decorative covering in a crimped condition about the stem portion of the floral arrangement.

14. The method of claim 13 wherein, in the step of providing the second band, the second band is constructed of a flexible material selected from a group of materials consisting of paper, metal foil, cloth (natural or synthetic), denim, burlap, polymer film or cling material or combinations thereof.

15. The method of claim 13 wherein, in the step of providing the second band, the second band is defined further as having a thickness in a range from about 0.1 mils to about 30 mils.

16. The method of claim 15 wherein, in the step of providing the second band, the second band is defined further as having a thickness in a range from about 0.1 mils to about 5 mils.

17. A method for wrapping a floral arrangement comprising:

provering a floral arrangement having a bloom end and a stem end;

providing a sheet of material having an upper surface and a lower surface;

providing a band having a first end and a second end and a bonding material disposed on at least a portion thereof, the first end of the band connected to the sheet of material;

extending the sheet of material about the floral arrangement with the upper surface of the sheet of material being disposed substantially adjacent at least a portion of the floral arrangement to provide a decorative covering extending about at least a portion of the floral arrangement; and extending the band about a portion of the decorative covering and pulling a portion of the decorative covering inwardly forming a crimped portion in the decorative covering and connecting the second end of the band to either a portion of the band or to a portion of the decorative covering via the bonding material for securing the band in the position extending about the portion of the decorative covering.

18. The method of claim 17 wherein, in the step of providing the band, the band is constructed of a flexible material selected from a group of materials consisting of paper, metal foil, cloth (natural or synthetic), denim, burlap, polymer film or cling material or combinations thereof.

19. The method of claim 17 wherein, the step of providing the band, the band is defined further as having a thickness in a range from about 0.1 mils to about 30 mils.

20. The method of claim 19 wherein, in the step of providing the band, the band is defined further as having a thickness in a range from about 0.1 mils to about 5 mils.

21. A method for wrapping a floral arrangement comprising:

providing a floral arrangement having a bloom portion and a stem portion;

providing a sheet of material having an upper surface, a lower surface and an outer periphery;

providing a band having a first end and a second end and a bonding material disposed on at least a portion thereof, the first end of the band connected to the sheet of material;

extending the sheet of material about at least a portion of the floral arrangement such that a portion of the sheet of material overlaps another portion of the sheet of material and forms a wrapper about the floral arrangement; and extending the band about a portion of the wrapper and connecting the second end of the band to either a portion of the band or a portion of the wrapper via the bonding material for securing the band in the position extending about the wrapper and thereby crimping a portion of the wrapper about the floral grouping.

22. The method of claim 21 wherein, in the step of providing the band, the band is constructed of a flexible material selected from a group of materials consisting of paper, metal foil, cloth (natural or synthetic), denim, burlap, polymer film or cling material or combinations thereof.

23. The method of claim 21 wherein, in the step of providing the band, the band is defined further as having a thickness in a range from about 0.1 mils to about 30 mils.

24. The method of claim 23 wherein, in the step of providing the band, the band is defined further as having a thickness in a range from about 0.1 mils to about 5 mils.

25. A method for wrapping a floral arrangement with a sheet of material to provide a decorative covering for the sheet of material wherein the decorative covering is provided with a crimped portion for securing the decorative covering about the floral arrangement, comprising:

providing a floral arrangement having a bloom portion and a stem portion;

providing a sheet of material having an upper surface, a lower surface, an outer periphery and a bonding material disposed on a portion of the sheet of material for connecting portions of the sheet of material to itself when the sheet of material is wrapped about the floral arrangement;

providing a band having a first end and a second end and a bonding material disposed on at least a portion thereof, the first end of the band connected to the sheet of material;

wrapping the sheet of material about at least a portion of the floral arrangement such that a portion of the sheet of material extends about at least a portion of the stem portion, about the flower portion and extends a distance beyond the flower portion of the floral arrangement and a portion of the sheet of material having the bonding material disposed thereon overlaps another portion of the sheet of material resulting in overlapping portions which are bonded together by the bonding material whereby the sheet of material substantially encompasses and surrounds a substantial portion of the floral grouping forming a decorative covering about the floral arrangement, the decorative covering having an opening extending through a lower end thereof and an opening extending through an upper end thereof with a portion of the stem portion of the floral arrangement extending through the opening in the lower end and a portion of the flower portion of the floral arrangement being exposed near the opening in the upper end thereof; and extending the band about the decorative covering so as to form a crimped portion in the decorative covering and connecting the second end of the band to either a portion of the band or to the crimped portion of the decorative covering via the bonding material for securing the band in the position extending about the decorative covering, the crimped portion and the band cooperating to hold the decorative covering in the position extending about the floral arrangement.

26. The method of claim 25 wherein, in the step of providing the band, the band is constructed of a flexible material selected from a group of materials consisting of paper, metal foil, cloth (natural or synthetic), denim, burlap, polymer film or cling material or combinations thereof.

27. The method of claim 25 wherein, in the step of providing the band, the band is defined further as having a thickness in a range from about 0.1 mils to about 30 mils.

28. The method of claim 27 wherein, in the step of providing the band, the band is defined further as having a thickness in a range from about 0.1 mils to about 5 mils.

* * * * *

UNITED STATES PATENT AND TRADEMARK OFFICE
CERTIFICATE OF CORRECTION

PATENT NO.    :   5,687,546                              Page 1 of 22

DATED         :   November 18, 1997

INVENTOR(S)   :   Donald E. Weder et al.

It is certified that error appears in the above-identified patent and that said Letters Patent is hereby corrected as shown below:

```
Cover page,  under FOREIGN PATENT DOCUMENTS, line 1, please
delete "46110", and substitute therefor --1276058--.
On drawing sheet,
Sheet 2 of 11, Figure 4, please insert --51-- as illustrated
below:
```

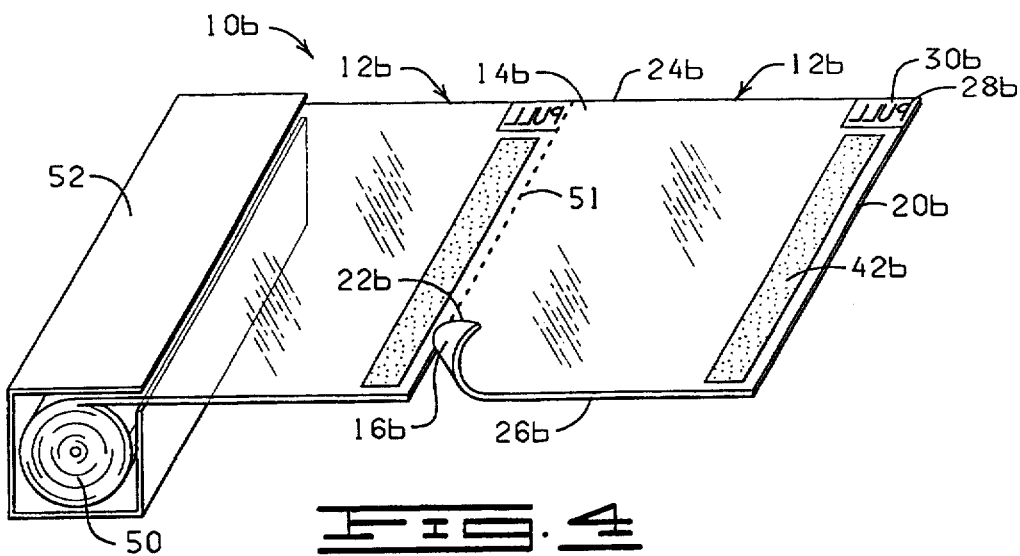

UNITED STATES PATENT AND TRADEMARK OFFICE
CERTIFICATE OF CORRECTION

PATENT NO.   : 5,687,546

DATED        : November 18, 1997

INVENTOR(S)  : Donald E. Weder et al.

It is certified that error appears in the above-identified patent and that said Letters Patent is hereby corrected as shown below:

Sheet 3 of 11, Figures 9, 10 and 11, please delete "53a", and substitute therefor --53-- as illustrated below.

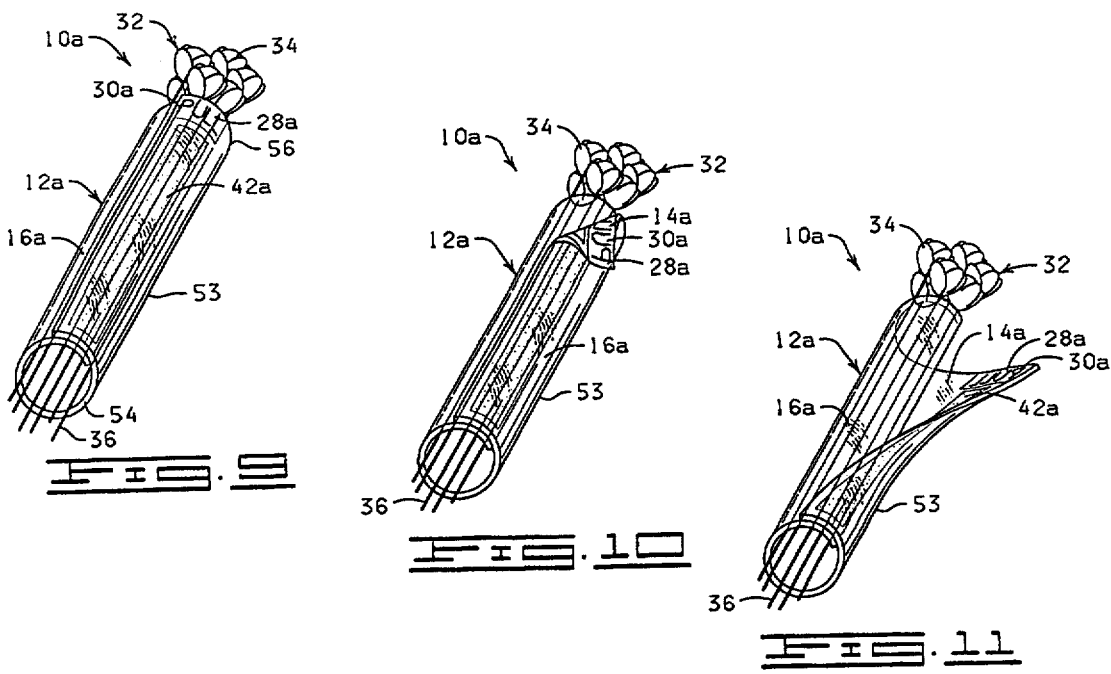

UNITED STATES PATENT AND TRADEMARK OFFICE
CERTIFICATE OF CORRECTION

PATENT NO.    :    5,687,546         Page 3 of 22

DATED         :    November 18, 1997

INVENTOR(S)   :    Donald E. Weder et al.

It is certified that error appears in the above-identified patent and that said Letters Patent is hereby corrected as shown below:

Sheet 7 of 11, Figure 26, please insert --26j-- as illustrated below:

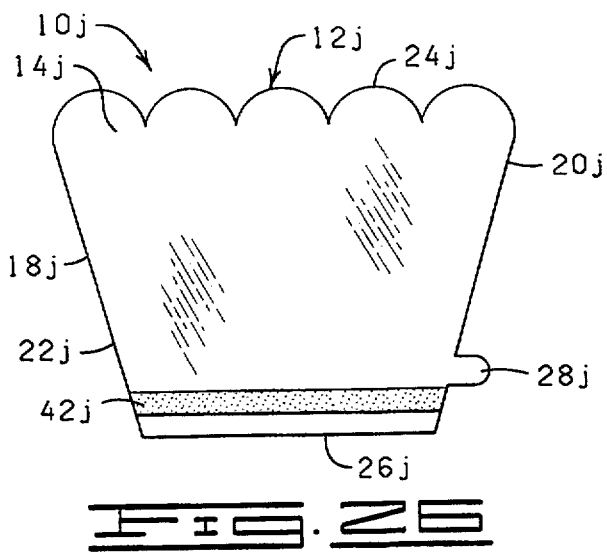

UNITED STATES PATENT AND TRADEMARK OFFICE
CERTIFICATE OF CORRECTION

PATENT NO. : 5,687,546

DATED : November 18, 1997

INVENTOR(S) : Donald E. Weder et al.

It is certified that error appears in the above-identified patent and that said Letters Patent is hereby corrected as shown below:

Column 1, line 17, please delete "METHOD", and substitute therefor --METHODS--.

Column 1, lines 52-53, please delete "5,752,560 issued Sep.6,1995", and substitute therefor --5,452,560 issued Sep. 26, 1995--.

Column 1, line 62, please delete "HAVE", and substitute therefor --HAVING--.

Column 1, line 64, please delete "Sep., 6," and substitute therefor --Sep. 6,--.

Column 5, line 1, after 'floral', please delete "U".

Column 5, line 35, please delete "perspective", and substitute therefor --plan--.

Column 5, line 38, please delete "plan", and substitute therefor --perspective--.

Column 5, lines 52-55, please delete "pad containing a plurality of sheets of material for providing a decorative covering for a floral arrangement in accordance with the present invention", and substitute therefor --a floral arrangement having the sheet of material of FIG. 33 disposed thereabout and having one end of the band of FIG. 34 connected to the sheet of material so as to be extendable about a stem portion of the floral arrangement--.

UNITED STATES PATENT AND TRADEMARK OFFICE
CERTIFICATE OF CORRECTION

PATENT NO.     :   5,687,546

DATED          :   November 18, 1997

INVENTOR(S)    :   Donald E. Weder et al.

It is certified that error appears in the above-identified patent and that said Letters Patent is hereby corrected as shown below:

Column 5, lines 66-67 and Column 6, lines 1-3, please delete "floral arrangement having the sheet of material of FIG. 33 disposed thereabout and having one end of the band of FIG. 34 connected to the sheet of material so as to be extendable about a stem portion of the floral arrangement", and substitute therefor --pad containing a plurality of sheets of material for providing a decorative covering for a floral arrangement in accordance with the present invention--.

Column 10, line 33, please delete "10", and substitute therefor --12--.

Column 10, line 40, please delete "10", should read --12--

Column 10, line 44, please delete "10", and substitute therefor --12--.

Column 12, line 16, please delete "51b", and substitute therefor --51--.

Column 13, line 4, please delete "70", and substitute therefor --53--.

Column 13, line 5, please delete "70", and substitute therefor --53c--.

Column 13, line 7, please delete "70", and substitute therefor --53--.

UNITED STATES PATENT AND TRADEMARK OFFICE
CERTIFICATE OF CORRECTION

PATENT NO.     :   5,687,546
DATED          :   November 18, 1997
INVENTOR(S)    :   Donald E. Weder et al.

It is certified that error appears in the above-identified patent and that said Letters Patent is hereby corrected as shown below:

Column 13, line 8, please delete "70", and substitute therefor --53--.

Column 13, line 15, please delete "70", and substitute therefor --53--.

Column 14, line 9, please delete "70", and substitute therefor --53--.

Column 14, line 11, please delete "70", and substitute therefor --53--.

Column 14, line 14, please delete "70", and substitute therefor --53--.

Column 14, line 16, please delete "70", and substitute therefor --53--.

Column 14, line 57, please delete "70c", and substitute therefor --53c--.

Column 17, line 65, please delete "70j", and substitute therefor --53j--.

Column 18, line 8, please delete "70j", and substitute therefor --53j--.

Column 18, line 10, please delete "70j", and substitute therefor --53j--.

UNITED STATES PATENT AND TRADEMARK OFFICE
CERTIFICATE OF CORRECTION

PATENT NO.    :    5,687,546

DATED         :    November 18, 1997

INVENTOR(S)   :    Donald E. Weder et al.

It is certified that error appears in the above-identified patent and that said Letters Patent is hereby corrected as shown below:

Column 18, line 23, please delete "70j", and substitute therefor --53j--.

Column 18, line 27, please delete "32i", and substitute therefor --32j--.

Column 18, line 55, please delete "70k", and substitute therefor --53k--.

Column 18, line 59, please delete "70k", and substitute therefor --53k--.

Column 18, line 62, please delete "70k", and substitute therefor --53k--.

Column 18, line 63, please delete "70k", and substitute therefor --53k--.

Column 18, line 64, after 'pull tab', please delete "70k", and substitute therefor --28k--.

Column 18, line 66, both occurrences, please delete "70k", and substitute therefor --53k--.

Column 18, line 67, please delete "70k", and substitute therefor --53k--.

Column 19, line 3, please delete "70k", and substitute therefor --53k--.

Column 19, line 27, please delete "33-36", and substitute therefor --33-40--.

UNITED STATES PATENT AND TRADEMARK OFFICE
CERTIFICATE OF CORRECTION

PATENT NO.   : 5,687,546

DATED        : November 18, 1997

INVENTOR(S)  : Donald E. Weder et al.

It is certified that error appears in the above-identified patent and that said Letters Patent is hereby corrected as shown below:

Column 19, line 7, please delete "70k", and substitute therefor --53k--.

Column 19, line 9, please delete "70k", and substitute therefor --53k--.

Column 19, line 10, please delete "70k", and substitute therefor --53k--.

Column 19, line 11, please delete "70k", and substitute therefor --53k--.

Column 19, line 13, please delete "70k", and substitute therefor --53k--.

Column 19, line 20, please delete "70k", and substitute therefor --53k--.

Column 19, line 45, please delete "32", and substitute therefor --32m--.

Column 19, line 50, please delete "32", and substitute therefor --32m--.

Column 19, line 51, please delete "32", and substitute therefor --32m--.

Column 19, line 55, please delete "32", and substitute therefor --32m--.

UNITED STATES PATENT AND TRADEMARK OFFICE
CERTIFICATE OF CORRECTION

PATENT NO.    :    5,687,546

DATED         :    November 18, 1997

INVENTOR(S)   :    Donald E. Weder et al.

It is certified that error appears in the above-identified patent and that said Letters Patent is hereby corrected as shown below:

Column 20, line 15, please delete "32", and substitute therefor --32m--.

Column 20, line 21, please delete "square", and substitute therefor --rectangular--.

Column 20, line 25, please delete "32", and substitute therefor --32m--.

Column 20, line 35, please delete "FIGS. 33 and 39", and substitute therefor --FIG. 33--.

Column 20, line 44, please delete "32", and substitute therefor --32m--.

Column 20, line 44, please delete "34", and substitute therefor --34m--.

Column 20, line 46, please delete "36", and substitute therefor --36m--.

Column 20, line 47, please delete "32", and substitute therefor --32m--.

Column 20, line 63, please delete "32", and substitute therefor --32m--.

Column 21, line 1, please delete "60", and substitute therefor --61--.

Column 21, line 2, please delete "60", and substitute therefor --61--.

UNITED STATES PATENT AND TRADEMARK OFFICE
CERTIFICATE OF CORRECTION

PATENT NO.      :   5,687,546

DATED           :   November 18, 1997

INVENTOR(S)     :   Donald E. Weder et al.

Page 10 of 22

It is certified that error appears in the above-identified patent and that said Letters Patent is hereby corrected as shown below:

Column 21, line 3, please delete "60", and substitute therefor --61--.

Column 21, line 5, please delete "60", and substitute therefor --61--.

Column 21, line 12, please delete "60", and substitute therefor --61--.

Column 21, line 15, please delete "60", and substitute therefor --61--.

Column 21, line 18, please delete "60", and substitute therefor --61--.

Column 21, line 19, please delete "35", and substitute therefor --34--.

Column 21, line 20, please delete "60", and substitute therefor --61--.

Column 21, line 21, please delete "70a", and substitute therefor --70--.

Column 21, line 22, please delete "60", and substitute therefor --61--.

Column 21, line 23, please delete "70b", and substitute therefor --71--.

Column 21, line 24, please delete "60", and substitute therefor --61--.

UNITED STATES PATENT AND TRADEMARK OFFICE
CERTIFICATE OF CORRECTION

PATENT NO. : 5,687,546

DATED : November 18, 1997

INVENTOR(S) : Donald E. Weder et al.

It is certified that error appears in the above-identified patent and that said Letters Patent is hereby corrected as shown below:

Column 21, line 26, please delete "32", and substitute therefor --32m--.

Column 21, line 28, please delete "36", and substitute therefor --36m--.

Column 21, line 29, please delete "32", and substitute therefor --32m--.

Column 21, line 33, please delete "32", and substitute therefor --32m--.

Column 21, line 35, both occurrences, please delete "32", and substitute therefor --32m--.

Column 21, line 38, please delete "32", and substitute therefor --32m--.

Column 21, line 39, please delete "20m", and substitute therefor --22m--.

Column 21, line 43, please delete "12", and substitute therefor --12m--.

Column 21, line 52, please delete "30", and substitute therefor --32m--.

Column 21, line 59, please delete "34", and substitute therefor --34m--.

Column 21, line 60, after 'portion', please delete "36", and substitute therefor --36m--.

UNITED STATES PATENT AND TRADEMARK OFFICE
CERTIFICATE OF CORRECTION

PATENT NO. : 5,687,546

DATED : November 18, 1997

INVENTOR(S) : Donald E. Weder et al.

It is certified that error appears in the above-identified patent and that said Letters Patent is hereby corrected as shown below:

Column 21, line 60, after 'arrangement', please delete "32", and substitute therefor --32m--.

Column 21, line 62, please delete "32", and substitute therefor --32m--.

Column 21, line 65, after 'portion', please delete "36", and substitute therefor --36m--.

Column 21, line 65, after 'arrangement', please delete "32", and substitute therefor --32m--.

Column 22, line 3, please delete "32", and substitute therefor --32m--.

Column 22, line 8, please delete "32", and substitute therefor --32m--.

Column 22, line 10, please delete "32", and substitute therefor --32m--.

Column 22, line 15, please delete '36", and substitute therefor --36m--.

Column 22, line 16, please delete "32", and substitute therefor --32m--.

Column 22, line 17, after 'portion', please delete "34", and substitute --34m--.

Column 22, line 17, after 'arrangement', please delete "32", and substitute therefor --32m--.

UNITED STATES PATENT AND TRADEMARK OFFICE
CERTIFICATE OF CORRECTION

PATENT NO. : 5,687,546

DATED : November 18, 1997

INVENTOR(S) : Donald E. Weder et al.

It is certified that error appears in the above-identified patent and that said Letters Patent is hereby corrected as shown below:

Column 22, line 18, please delete "74", and substitute therefor --76--.

Column 22, line 19, please delete "74", and substitute therefor --76--.

Column 22, line 20, please delete "34", and substitute therefor --34m--.

Column 22, line 21, please delete "32", and substitute therefor --32m--.

Column 22, line 22, please delete "34", and substitute therefor --34m--.

Column 22, line 22, please delete "32", and substitute therefor --32m--.

Column 22, line 27, please delete "32", and substitute therefor --32m--.

Column 22, line 28, please delete "60", and substitute therefor --61--.

Column 22, line 30, please delete "60", and substitute therefor --61--.

Column 22, line 32, please delete "34", and substitute therefor --34m--.

UNITED STATES PATENT AND TRADEMARK OFFICE
CERTIFICATE OF CORRECTION

PATENT NO. : 5,687,546

DATED : November 18, 1997

INVENTOR(S) : Donald E. Weder et al.

It is certified that error appears in the above-identified patent and that said Letters Patent is hereby corrected as shown below:

Column 22, line 32, please delete "32", and substitute therefor --32m--.

Column 22, line 33, please delete "60", and substitute therefor --61--.

Column 22, line 34, please delete "70a", and substitute therefor --70--.

Column 22, line 34, please delete "60", and substitute therefor --61--.

Column 22, line 36, please delete "60", and substitute therefor --61--.

Column 22, line 38, please delete "84", and substitute therefor --86--.

Column 22, line 39, please delete "60", and substitute therefor --61--.

Column 22, line 40, please delete "60", and substitute therefor --61--.

Column 22, line 42, please delete "70b", and substitute therefor --71--.

Column 22, line 42, please delete "60", and substitute therefor --61--.

UNITED STATES PATENT AND TRADEMARK OFFICE
CERTIFICATE OF CORRECTION

PATENT NO. : 5,687,546

DATED : November 18, 1997

INVENTOR(S) : Donald E. Weder et al.

It is certified that error appears in the above-identified patent and that said Letters Patent is hereby corrected as shown below:

```
Column 22, line 44, please delete "60", and substitute therefor
--61--.

Column 22, line 45, please delete "60", and substitute therefor
--61--.

Column 22, line 45, please delete "74", and substitute therefor
--76--.

Column 22, line 47, please delete "84", and substitute therefor
--86--.

Column 22, line 48, please delete "34", and substitute therefor
--34m--.

Column 22, line 49, please delete "32", and substitute therefor
--32m--.

Column 22, line 50, please delete "84a", and substitute therefor
--87--.

Column 22, line 52, please delete "34", and substitute therefor
--34m--.

Column 22, line 52, please delete "32", and substitute therefor
--32m--.

Column 22, line 53, please delete "36", and substitute therefor
--36m--.

Column 22, line 53, please delete "32", and substitute therefor
--32m--.
```

UNITED STATES PATENT AND TRADEMARK OFFICE
CERTIFICATE OF CORRECTION

PATENT NO.     : 5,687,546

DATED          : November 18, 1997

INVENTOR(S)    : Donald E. Weder et al.

It is certified that error appears in the above-identified patent and that said Letters Patent is hereby corrected as shown below:

Column 22, line 54, please delete "60", and substitute therefor --61--.

Column 22, line 56, please delete "60", and substitute therefor --61--.

Column 22, line 57, please delete "70a", and substitute therefor --70--.

Column 22, line 59, please delete "84", and substitute therefor --86--.

Column 22, line 59, please delete "60", and substitute therefor --61--.

Column 22, line 61, please delete "34", and substitute therefor --34m--.

Column 22, line 62, please delete "32", and substitute therefor --32m--.

Column 22, line 62, please delete "86", and substitute therefor --87--.

Column 22, line 64, please delete "34", and substitute therefor --34m--.

Column 22, line 65, please delete "group 32", and substitute therefor --arrangement 32m--.

Column 22, line 65, please delete "36", and substitute therefor --36m--.

UNITED STATES PATENT AND TRADEMARK OFFICE
CERTIFICATE OF CORRECTION

PATENT NO.    :   5,687,546

DATED         :   November 18, 1997

INVENTOR(S)   :   Donald E. Weder et al.

It is certified that error appears in the above-identified patent and that said Letters Patent is hereby corrected as shown below:

Column 22, line 66, please delete "32", and substitute therefor --32m--.

Column 22, line 67, please delete "60", and substitute therefor --61--.

Column 23, line 2, please delete "34", and substitute therefor --34m--.

Column 23, line 2, please delete "32", and substitute therefor --32m--.

Column 23, line 3, please delete "60", and substitute therefor --61--.

Column 23, line 4, please delete "60", and substitute therefor --61--.

Column 23, line 6, please delete "84", and substitute therefor --86--.

Column 23, line 7, please delete "34", and substitute therefor --34m--.

Column 23, line 7, please delete "32", and substitute therefor --32m--.

Column 23, line 8, please delete "60", and substitute therefor --61--.

UNITED STATES PATENT AND TRADEMARK OFFICE
CERTIFICATE OF CORRECTION

PATENT NO.    :    5,687,546                              Page 18 of 22
DATED         :    November 18, 1997
INVENTOR(S)   :    Donald E. Weder et al.

It is certified that error appears in the above-identified patent and that said Letters Patent is hereby corrected as shown below:

Column 23, line 9, please delete "60", and substitute therefor --61--.

Column 23, line 10, please delete "70b", and substitute therefor --71--.

Column 23, line 11, please delete "60", and substitute therefor --61--.

Column 23, line 13, please delete "60", and substitute therefor --61--.

Column 23, line 15, please delete "36", and substitute therefor --36m--.

Column 23, line 16, please delete "32", and substitute therefor --32m--.

Column 23, line 19, please delete "86", and substitute therefor --87--.

Column 23, line 19, please delete "37", and substitute therefor --39--.

Column 23, line 20, please delete "36", and substitute therefor --36m--.

Column 23, line 21, please delete "32", and substitute therefor --32m--.

UNITED STATES PATENT AND TRADEMARK OFFICE
CERTIFICATE OF CORRECTION

PATENT NO.    :    5,687,546                           Page 19 of 22

DATED         :    November 18, 1997

INVENTOR(S)   :    Donald E. Weder et al.

It is certified that error appears in the above-identified patent and that said Letters Patent is hereby corrected as shown below:

Column 23, line 21, please delete "90", and substitute therefor --89--.

Column 23, line 25, please delete "90", and substitute therefor --89--.

Column 23, line 27, please delete "86", and substitute therefor --87--.

Column 23, line 28, please delete "86", and substitute therefor --87--.

Column 23, line 29, please delete "36", and substitute therefor --36m--.

Column 23, line 30, please delete "32", and substitute therefor --32m--.

Column 23, line 30, please delete "60", and substitute therefor --61--.

Column 23, line 31, please delete "84", and substitute therefor --86--.

Column 23, line 32, please delete "86", and substitute therefor --87--.

Column 23, line 33, please delete "32", and substitute therefor --32m--.

Column 23, line 34, please delete "60", and substitute therefor --61--.

UNITED STATES PATENT AND TRADEMARK OFFICE
CERTIFICATE OF CORRECTION

PATENT NO. : 5,687,546

DATED : November 18, 1997

INVENTOR(S) : Donald E. Weder et al.

It is certified that error appears in the above-identified patent and that said Letters Patent is hereby corrected as shown below:

Column 23, line 35, please delete "60", and substitute therefor --61--.

Column 23, line 53, please delete "32", and substitute therefor --32m--.

Column 23, line 66, please delete "30", and substitute therefor --32m--.

Column 23, line 67, please delete "32", and substitute therefor --32m--.

Column 24, line 1, please delete "32", and substitute therefor --32m--.

Column 24, line 6, please delete "32", and substitute therefor --32m--.

Column 24, line 7, please delete "29", and substitute therefor --92--.

Column 24, line 7, please delete "32", and substitute therefor --32m--.

Column 24, line 9, please delete "32", and substitute therefor --32m--.

Column 24, line 10, please delete "32", and substitute therefor --32m--.

Column 24, line 13, please delete "32", and substitute therefor --32m--.

UNITED STATES PATENT AND TRADEMARK OFFICE
CERTIFICATE OF CORRECTION

PATENT NO.    :    5,687,546

DATED         :    November 18, 1997

INVENTOR(S)   :    Donald E. Weder et al.

It is certified that error appears in the above-identified patent and that said Letters Patent is hereby corrected as shown below:

Column 24, line 17, please delete "32", and substitute therefor --32m--.

Col. 24, lines 22 & 23, delete "90", and substitute therefor --92--.

Column 24, line 25, both occurrences, please delete "90", and substitute therefor --92--.

Column 24, line 26, please delete "30", and substitute therefor --32m--.

Column 24, line 28, please delete "90", and substitute therefor --92--.

Column 24, line 29, please delete "90", and substitute therefor --92--.

Column 24, line 30, please delete "32", and substitute therefor --32m--.

Column 24, line 32, please delete "90", and substitute therefor --92--.

Column 24, line 33, please delete "90", and substitute therefor --92--.

Column 24, line 35, please delete "32", and substitute therefor --32m--.

UNITED STATES PATENT AND TRADEMARK OFFICE
CERTIFICATE OF CORRECTION

PATENT NO. : 5,687,546
DATED : November 18, 1997
INVENTOR(S) : Donald E. Weder et al.

It is certified that error appears in the above-indentified patent and that said Letters Patent is hereby corrected as shown below:

Column 24, line 36, please delete "90", and substitute therefor --92--.

Signed and Sealed this

Eleventh Day of August 1998

Attest:

Attesting Officer

BRUCE LEHMAN

Commissioner of Patents and Trademarks